(12) United States Patent
Thomaides et al.

(10) Patent No.: US 9,321,873 B2
(45) Date of Patent: *Apr. 26, 2016

(54) HYBRID COPOLYMER COMPOSITIONS FOR PERSONAL CARE APPLICATIONS

(75) Inventors: John S. Thomaides, Berkeley Heights, NJ (US); Klin A. Rodrigues, Signal Mountain, TN (US); Samuel A. Vona, Jr., Highland, NY (US); Gary T. Martino, Monmouth Junction, NJ (US); Anthony J. Adamo, Flagtown, NJ (US)

(73) Assignee: AKZO NOBEL N.V., Arnhem (NL)

( * ) Notice: Subject to any disclaimer, the term of this patent is extended or adjusted under 35 U.S.C. 154(b) by 502 days.

This patent is subject to a terminal disclaimer.

(21) Appl. No.: 13/387,906

(22) PCT Filed: Jul. 30, 2010

(86) PCT No.: PCT/US2010/043949
§ 371 (c)(1),
(2), (4) Date: Jan. 30, 2012

(87) PCT Pub. No.: WO2011/017223
PCT Pub. Date: Feb. 10, 2011

(65) Prior Publication Data
US 2012/0134942 A1 May 31, 2012

Related U.S. Application Data

(63) Continuation of application No. 12/533,802, filed on Jul. 31, 2009, now abandoned, and a continuation of application No. 12/689,844, filed on Jan. 19, 2010, now abandoned, which is a continuation of application No. 11/458,180, filed on Jul. 18, 2006, now Pat. No. 7,666,963.

(60) Provisional application No. 60/701,380, filed on Jul. 21, 2005.

(30) Foreign Application Priority Data

Nov. 10, 2009 (EP) .................................... 09175465

(51) Int. Cl.
| | | |
|---|---|---|
| *A61K 8/18* | (2006.01) | |
| *C08F 289/00* | (2006.01) | |
| *C02F 5/10* | (2006.01) | |
| *C08F 2/38* | (2006.01) | |
| *C08F 251/00* | (2006.01) | |
| *C08F 251/02* | (2006.01) | |
| *C08F 291/00* | (2006.01) | |
| *C08L 51/00* | (2006.01) | |
| *C08L 51/02* | (2006.01) | |
| *C11D 3/22* | (2006.01) | |
| *C11D 3/37* | (2006.01) | |

(52) U.S. Cl.
CPC ............... *C08F 289/00* (2013.01); *C02F 5/10* (2013.01); *C08F 2/38* (2013.01); *C08F 251/00* (2013.01); *C08F 251/02* (2013.01); *C08F 291/00* (2013.01); *C08L 51/003* (2013.01); *C08L 51/02* (2013.01); *C11D 3/222* (2013.01); *C11D 3/3788* (2013.01); *Y02W 10/37* (2015.05)

(58) Field of Classification Search
CPC ............................... C08L 51/003; C08L 51/02
USPC .............. 510/392, 119, 130, 137; 424/59, 63, 424/70.6, 70.11, 70.13, 73, 78.02, 78.03
See application file for complete search history.

(56) References Cited

U.S. PATENT DOCUMENTS

| | | |
|---|---|---|
| 2,536,658 A | 1/1951 | Rheineck |
| 2,798,053 A | 7/1957 | Brown |
| 2,954,347 A | 9/1960 | St. John et al. |
| 3,048,548 A | 8/1962 | Martin et al. |
| 3,308,067 A | 3/1967 | Diehl |
| 3,314,891 A | 4/1967 | Schmolka et al. |
| 3,334,147 A | 8/1967 | Brunelle et al. |
| 3,442,242 A | 5/1969 | Laskey et al. |
| 3,455,839 A | 7/1969 | Rauner |
| 3,518,176 A | 6/1970 | Reyes et al. |
| 3,629,121 A | 12/1971 | Eldib |
| 3,639,312 A | 2/1972 | Turner |
| 3,673,148 A | 6/1972 | Vasta |
| 3,687,878 A | 8/1972 | Imoto et al. |
| 3,723,322 A | 3/1973 | Diehl |
| 3,803,285 A | 4/1974 | Jensen |
| 3,929,107 A | 12/1975 | Renger |

(Continued)

FOREIGN PATENT DOCUMENTS

| | | |
|---|---|---|
| CA | 2074747 | 2/1993 |
| CN | 1087649 A | 6/1994 |

(Continued)

OTHER PUBLICATIONS

U.S. Appl. No. 13/387,882, filed Jan. 30, 2012.*
International Search Report issued in PCT/US2012/049514 mailed Feb. 19, 2013, 3 pages.
International Search Report and Written Opinion issued in PCT/US2012/049595, mailed Feb. 25, 2013, 10 pages.
International Search Report and Written Opinion issued in International Application No. PCT/US2012/049547, mailed Jan. 23, 2013, 11 pages.
International Search Report and Written Opinion issued in PCT/US2012/049564, mailed Jan. 23, 2013, 10 pages.
International Search Report and Written Opinion issued in PCT/US2012/049584, mailed Jan. 21, 2013, 11 pages.
Athawale et al., "Graft Polymerization: Starch as a Model Substrate", J.M.S. Rev. Macromol. Chem. Phys., C39(3), 445-480, 1999.

(Continued)

*Primary Examiner* — Edward Cain
(74) *Attorney, Agent, or Firm* — Sandra B. Weiss

(57) ABSTRACT

A personal care composition includes a hybrid copolymer including at least one ethylenically unsaturated monomer and a naturally derived hydroxyl containing chain transfer agent as an end group, a hybrid synthetic copolymer including one or more synthetic polymers derived from the at least one ethylenically unsaturated monomer with at least one initiator fragment as an end group and an effective amount of a cosmetic or personal care additive.

36 Claims, 1 Drawing Sheet

(56) References Cited

U.S. PATENT DOCUMENTS

| | | |
|---|---|---|
| 3,929,678 A | 12/1975 | Laughlin et al. |
| 3,933,672 A | 1/1976 | Bartolotta et al. |
| 4,048,122 A | 9/1977 | Sibley et al. |
| 4,131,576 A | 12/1978 | Iovine et al. |
| 4,133,779 A | 1/1979 | Hellyer et al. |
| 4,141,841 A | 2/1979 | McDanald |
| 4,228,042 A | 10/1980 | Letton |
| 4,239,660 A | 12/1980 | Kingry |
| 4,260,529 A | 4/1981 | Letton |
| 4,265,779 A | 5/1981 | Gandolfo et al. |
| 4,322,472 A | 3/1982 | Kaspar et al. |
| 4,374,035 A | 2/1983 | Bossu |
| 4,379,080 A | 4/1983 | Murphy |
| 4,388,205 A | 6/1983 | Stettler et al. |
| 4,412,934 A | 11/1983 | Chung et al. |
| 4,483,779 A | 11/1984 | Llenado et al. |
| 4,483,780 A | 11/1984 | Llenado |
| 4,521,578 A | 6/1985 | Chen et al. |
| 4,536,314 A | 8/1985 | Hardy et al. |
| 4,539,130 A | 9/1985 | Thompson et al. |
| 4,557,763 A | 12/1985 | George et al. |
| 4,565,647 A | 1/1986 | Llenado |
| 4,597,898 A | 7/1986 | Vander Meer |
| 4,605,721 A | 8/1986 | Jenkins et al. |
| 4,606,838 A | 8/1986 | Burns |
| 4,618,914 A | 10/1986 | Sato et al. |
| 4,634,551 A | 1/1987 | Burns et al. |
| 4,652,392 A | 3/1987 | Baginski et al. |
| 4,671,891 A | 6/1987 | Hartman |
| 4,681,592 A | 7/1987 | Hardy et al. |
| 4,681,695 A | 7/1987 | Divo |
| 4,681,704 A | 7/1987 | Bernardino et al. |
| 4,686,063 A | 8/1987 | Burns |
| 4,702,857 A | 10/1987 | Gosselink |
| 4,782,901 A | 11/1988 | Phelps et al. |
| 4,830,773 A | 5/1989 | Olson |
| 4,855,069 A | 8/1989 | Schuppiser et al. |
| 4,963,629 A | 10/1990 | Driemel et al. |
| 4,968,451 A | 11/1990 | Scheibel et al. |
| 5,032,659 A | 7/1991 | Heidel |
| 5,071,895 A | 12/1991 | Hughes et al. |
| 5,076,968 A | 12/1991 | Fringeli et al. |
| 5,121,795 A | 6/1992 | Ewert et al. |
| 5,125,455 A | 6/1992 | Harris et al. |
| 5,147,907 A | 9/1992 | Rinck et al. |
| 5,223,171 A | 6/1993 | Jost et al. |
| 5,227,446 A | 7/1993 | Denzinger et al. |
| 5,248,449 A | 9/1993 | Mitchell et al. |
| 5,264,470 A | 11/1993 | Eoff |
| 5,296,470 A | 3/1994 | Vaslin et al. |
| 5,304,620 A | 4/1994 | Holtmyer et al. |
| 5,326,864 A | 7/1994 | Besemer et al. |
| 5,332,528 A | 7/1994 | Pan et al. |
| 5,378,830 A | 1/1995 | Yeh |
| 5,385,959 A | 1/1995 | Tsaur et al. |
| 5,412,026 A | 5/1995 | Holy et al. |
| 5,415,807 A | 5/1995 | Gosselink et al. |
| 5,435,935 A | 7/1995 | Kupneski |
| 5,478,503 A | 12/1995 | Swift |
| 5,500,154 A | 3/1996 | Bacon et al. |
| 5,501,815 A | 3/1996 | Man |
| 5,518,646 A | 5/1996 | Van den Brom |
| 5,518,657 A | 5/1996 | Fringeli et al. |
| 5,523,023 A | 6/1996 | Kleinstuck et al. |
| 5,543,459 A | 8/1996 | Hartmann et al. |
| 5,547,612 A | 8/1996 | Austin et al. |
| 5,565,145 A | 10/1996 | Watson et al. |
| 5,580,154 A | 12/1996 | Coulter et al. |
| 5,580,941 A | 12/1996 | Krause et al. |
| 5,583,193 A | 12/1996 | Aravindakshan et al. |
| 5,654,198 A | 8/1997 | Carrier et al. |
| 5,656,646 A | 8/1997 | Perner et al. |
| 5,658,651 A | 8/1997 | Smith et al. |
| 5,670,475 A | 9/1997 | Trinh et al. |
| 5,674,511 A | 10/1997 | Kacher et al. |
| 5,753,770 A | 5/1998 | Breitenbach et al. |
| 5,756,442 A | 5/1998 | Jeschke et al. |
| 5,760,154 A | 6/1998 | Krause et al. |
| 5,830,241 A | 11/1998 | Rohringer et al. |
| 5,852,069 A | 12/1998 | Meister et al. |
| 5,854,191 A | 12/1998 | Krause et al. |
| 5,854,321 A | 12/1998 | Krause et al. |
| 5,869,070 A | 2/1999 | Dixon et al. |
| 5,942,477 A | 8/1999 | Giret et al. |
| 5,942,479 A | 8/1999 | Frankenbach et al. |
| 5,942,485 A | 8/1999 | Kemen |
| 5,945,127 A | 8/1999 | Breitenbach et al. |
| 5,952,278 A | 9/1999 | Mao et al. |
| 5,977,275 A | 11/1999 | Rodrigues et al. |
| 5,985,809 A | 11/1999 | Frankenbach et al. |
| 5,990,065 A | 11/1999 | Vinson et al. |
| 6,004,922 A | 12/1999 | Watson et al. |
| 6,008,181 A | 12/1999 | Cripe et al. |
| 6,020,303 A | 2/2000 | Cripe et al. |
| 6,022,844 A | 2/2000 | Baillely et al. |
| 6,025,311 A | 2/2000 | Clarke et al. |
| 6,060,299 A | 5/2000 | Sreekrishna et al. |
| 6,060,443 A | 5/2000 | Cripe et al. |
| 6,060,582 A | 5/2000 | Hubbell et al. |
| 6,069,122 A | 5/2000 | Vinson et al. |
| 6,093,856 A | 7/2000 | Cripe et al. |
| 6,103,839 A | 8/2000 | Patel et al. |
| 6,106,849 A | 8/2000 | Malkan et al. |
| 6,130,194 A | 10/2000 | Pancheri et al. |
| 6,136,769 A | 10/2000 | Asano et al. |
| 6,143,707 A | 11/2000 | Trinh et al. |
| 6,150,322 A | 11/2000 | Singleton et al. |
| 6,153,570 A | 11/2000 | Decoster |
| 6,153,577 A | 11/2000 | Cripe et al. |
| 6,162,423 A | 12/2000 | Sebag et al. |
| 6,169,062 B1 | 1/2001 | Salager et al. |
| 6,194,362 B1 | 2/2001 | Trinh et al. |
| 6,221,825 B1 | 4/2001 | Williams, Jr. et al. |
| 6,225,462 B1 | 5/2001 | Berry et al. |
| 6,231,650 B1 | 5/2001 | Mallow et al. |
| 6,255,427 B1 | 7/2001 | Exner et al. |
| 6,303,560 B1 | 10/2001 | Hartan et al. |
| 6,365,561 B1 | 4/2002 | Vinson et al. |
| 6,372,708 B1 | 4/2002 | Kasturi et al. |
| 6,376,438 B1 | 4/2002 | Rosenberger et al. |
| 6,384,132 B1 | 5/2002 | Horley et al. |
| 6,423,775 B1 | 7/2002 | Brune et al. |
| 6,451,747 B1 | 9/2002 | Decoster |
| 6,482,994 B2 | 11/2002 | Scheper et al. |
| 6,528,477 B2 | 3/2003 | Kasturi et al. |
| 6,537,957 B1 | 3/2003 | Cardola et al. |
| 6,573,234 B1 | 6/2003 | Sivik et al. |
| 6,589,926 B1 | 7/2003 | Vinson et al. |
| 6,605,182 B1 | 8/2003 | Danner |
| 6,627,590 B1 | 9/2003 | Sherry et al. |
| 6,645,925 B2 | 11/2003 | Sivik et al. |
| 6,656,900 B2 | 12/2003 | Sivik et al. |
| 6,764,992 B2 | 7/2004 | Kumar et al. |
| 6,800,712 B2 | 10/2004 | Doane et al. |
| 6,867,262 B1 | 3/2005 | Angel et al. |
| 6,908,955 B2 | 6/2005 | Porsch et al. |
| 6,911,053 B2 | 6/2005 | Bijsterbosch et al. |
| 7,012,048 B2 | 3/2006 | Drovetskaya et al. |
| 7,087,662 B2 | 8/2006 | Ghosh et al. |
| 7,151,079 B2 | 12/2006 | Fack et al. |
| 7,153,821 B2 | 12/2006 | Blokzijl et al. |
| 7,157,413 B2 | 1/2007 | Lazzeri et al. |
| 7,435,293 B2 | 10/2008 | Caveny et al. |
| 7,589,051 B2 | 9/2009 | Erazo-Majewicz et al. |
| 7,666,963 B2 | 2/2010 | Rodrigues et al. |
| 7,670,388 B2 | 3/2010 | Sugano et al. |
| 7,727,945 B2 | 6/2010 | Rodrigues et al. |
| 7,740,873 B2 | 6/2010 | Decoster et al. |
| 7,754,666 B2 | 7/2010 | Walters et al. |
| 7,902,276 B2 | 3/2011 | Sakai et al. |
| 8,058,374 B2 | 11/2011 | Rodrigues et al. |
| 8,227,381 B2 | 7/2012 | Rodrigues et al. |
| 8,674,021 B2 | 3/2014 | Rodrigues et al. |
| 2002/0016282 A1 | 2/2002 | Kumar et al. |

(56) References Cited

U.S. PATENT DOCUMENTS

| | | |
|---|---|---|
| 2002/0034487 A1 | 3/2002 | Maubru et al. |
| 2002/0055446 A1 | 5/2002 | Perron et al. |
| 2002/0106747 A1 | 8/2002 | Cheng et al. |
| 2002/0173592 A1 | 11/2002 | Saeki et al. |
| 2003/0008793 A1 | 1/2003 | Takiguchi et al. |
| 2003/0008804 A1 | 1/2003 | Xu et al. |
| 2003/0092584 A1 | 5/2003 | Crews |
| 2003/0147827 A1 | 8/2003 | Decoster et al. |
| 2003/0147842 A1 | 8/2003 | Restle et al. |
| 2003/0211952 A1 | 11/2003 | Erazo Majewicz et al. |
| 2004/0033929 A1 | 2/2004 | Bertleff et al. |
| 2004/0039137 A1 | 2/2004 | Heinemann et al. |
| 2004/0048760 A1 | 3/2004 | Rabon et al. |
| 2004/0067864 A1 | 4/2004 | Aubay et al. |
| 2004/0067865 A1 | 4/2004 | Harrison |
| 2004/0071742 A1 | 4/2004 | Popplewell et al. |
| 2004/0092425 A1 | 5/2004 | Boutique et al. |
| 2004/0102354 A1 | 5/2004 | Fack et al. |
| 2004/0103483 A1 | 6/2004 | Delplancke et al. |
| 2004/0107505 A1 | 6/2004 | Harrison et al. |
| 2004/0147425 A1 | 7/2004 | Castro et al. |
| 2004/0170596 A1 | 9/2004 | Hauschel et al. |
| 2004/0214736 A1 | 10/2004 | Modi |
| 2004/0266653 A1 | 12/2004 | Delplancke et al. |
| 2004/0266655 A1 | 12/2004 | Baum et al. |
| 2005/0019352 A1 | 1/2005 | Mercier et al. |
| 2005/0028293 A1 | 2/2005 | Geffroy |
| 2005/0108832 A1 | 5/2005 | Torri et al. |
| 2005/0143278 A1 | 6/2005 | Pegelow et al. |
| 2005/0171287 A1 | 8/2005 | Baum et al. |
| 2005/0175572 A1 | 8/2005 | Nguyen-Kim et al. |
| 2005/0176878 A1 | 8/2005 | Ettl et al. |
| 2005/0202985 A1 | 9/2005 | Nieendick et al. |
| 2005/0202989 A1 | 9/2005 | Wilson |
| 2005/0215449 A1 | 9/2005 | Penninger et al. |
| 2005/0256027 A1 | 11/2005 | Heibel et al. |
| 2005/0267008 A1 | 12/2005 | Carvell et al. |
| 2005/0271595 A1 | 12/2005 | Brown |
| 2005/0276831 A1 | 12/2005 | Dihora et al. |
| 2006/0019847 A1 | 1/2006 | Fan et al. |
| 2006/0019858 A1 | 1/2006 | Kruse et al. |
| 2006/0024353 A1 | 2/2006 | Trouve et al. |
| 2006/0029561 A1 | 2/2006 | Gunn et al. |
| 2006/0106186 A1 | 5/2006 | Dupont et al. |
| 2006/0111511 A1 | 5/2006 | Narayan et al. |
| 2006/0182917 A1 | 8/2006 | Wood et al. |
| 2006/0183203 A1 | 8/2006 | DeAngelis |
| 2006/0183856 A1 | 8/2006 | Wood et al. |
| 2006/0183857 A1 | 8/2006 | Wood et al. |
| 2006/0252901 A1 | 11/2006 | Narayan et al. |
| 2006/0258555 A1 | 11/2006 | Filippini et al. |
| 2006/0258557 A1 | 11/2006 | Popplewell et al. |
| 2006/0281654 A1 | 12/2006 | Brooker et al. |
| 2007/0015678 A1 | 1/2007 | Rodrigues et al. |
| 2007/0021577 A1 | 1/2007 | Rodrigues et al. |
| 2007/0054816 A1 | 3/2007 | Berthier et al. |
| 2007/0056900 A1 | 3/2007 | Mathauer et al. |
| 2007/0111920 A1 | 5/2007 | Baur et al. |
| 2007/0138105 A1 | 6/2007 | Takeda et al. |
| 2007/0260046 A1 | 11/2007 | Tomita et al. |
| 2008/0020948 A1 | 1/2008 | Rodrigues et al. |
| 2008/0020961 A1 | 1/2008 | Rodrigues et al. |
| 2008/0021167 A1 | 1/2008 | Rodrigues |
| 2008/0021168 A1 | 1/2008 | Rodrigues et al. |
| 2008/0118568 A1 | 5/2008 | Smets et al. |
| 2008/0139441 A1 | 6/2008 | Xiao et al. |
| 2008/0146478 A1 | 6/2008 | Lei et al. |
| 2008/0230193 A1 | 9/2008 | Mori et al. |
| 2008/0274940 A1 | 11/2008 | Tjelta et al. |
| 2008/0274942 A1 | 11/2008 | Tjelta et al. |
| 2008/0277620 A1 | 11/2008 | Kesavan et al. |
| 2008/0305982 A1 | 12/2008 | Smets et al. |
| 2008/0311064 A1 | 12/2008 | Lei et al. |
| 2009/0011214 A1 | 1/2009 | Wang |
| 2009/0011973 A1 | 1/2009 | Besse et al. |
| 2009/0023625 A1 | 1/2009 | Tang et al. |
| 2009/0062175 A1 | 3/2009 | Cermenati et al. |
| 2009/0087390 A1 | 4/2009 | Modi |
| 2009/0176687 A1 | 7/2009 | Tjelta et al. |
| 2009/0258042 A1 | 10/2009 | Anastasiou et al. |
| 2009/0258810 A1 | 10/2009 | Song et al. |
| 2009/0326165 A1 | 12/2009 | Patil et al. |
| 2010/0008870 A1 | 1/2010 | Dihora et al. |
| 2010/0056413 A1 | 3/2010 | Harry, Jr. et al. |
| 2010/0069280 A1 | 3/2010 | Rodrigues et al. |
| 2010/0075879 A1 | 3/2010 | Gizaw et al. |
| 2010/0075880 A1 | 3/2010 | Dupont et al. |
| 2010/0075887 A1 | 3/2010 | Wang et al. |
| 2010/0086575 A1 | 4/2010 | Dihora et al. |
| 2010/0093584 A1 | 4/2010 | Brand et al. |
| 2010/0154831 A1 | 6/2010 | Neplenbrock et al. |
| 2010/0167547 A1 | 7/2010 | Kamimura |
| 2010/0236736 A1 | 9/2010 | Brockmeyer et al. |
| 2010/0280146 A1 | 11/2010 | Vanderlaan et al. |
| 2010/0317560 A1 | 12/2010 | Ryther et al. |
| 2011/0017945 A1 | 1/2011 | Miralles et al. |
| 2011/0021410 A1 | 1/2011 | Miralles et al. |
| 2011/0028371 A1 | 2/2011 | Rodrigues et al. |
| 2011/0034622 A1 | 2/2011 | Kawamura et al. |
| 2011/0118168 A1 | 5/2011 | Schunicht et al. |
| 2011/0136718 A1 | 6/2011 | Rodrigues et al. |
| 2012/0128608 A1 | 5/2012 | Rodrigues et al. |
| 2012/0134942 A1 | 5/2012 | Thomaides et al. |
| 2013/0035273 A1 | 2/2013 | Silvernail et al. |
| 2013/0035274 A1 | 2/2013 | Silvernail et al. |
| 2013/0035275 A1 | 2/2013 | Silvernail et al. |
| 2013/0035276 A1 | 2/2013 | Silvernail et al. |
| 2013/0035277 A1 | 2/2013 | Silvernail et al. |
| 2013/0137799 A1 | 5/2013 | Rodrigues et al. |

FOREIGN PATENT DOCUMENTS

| | | |
|---|---|---|
| CN | 101830015 A | 9/2010 |
| CN | 101863540 A | 10/2010 |
| CN | 102146150 A | 8/2011 |
| DE | 40 38 908 A1 | 6/1992 |
| EP | 0 130 756 A1 | 1/1985 |
| EP | 0 404 377 A1 | 12/1990 |
| EP | 0 405 917 A1 | 1/1991 |
| EP | 00438215 | 1/1991 |
| EP | 0 441 197 A2 | 8/1991 |
| EP | 0 526 800 A1 | 2/1993 |
| EP | 0 577 519 A1 | 1/1994 |
| EP | 0628655 B1 | 6/1994 |
| EP | 0 605 084 A1 | 7/1994 |
| EP | 0505371 B1 | 3/1996 |
| EP | 0 725 131 A1 | 8/1996 |
| EP | 0725131 A1 | 8/1996 |
| EP | 0 869 169 A1 | 10/1998 |
| EP | 0 957 114 A1 | 11/1999 |
| EP | 0653485 B1 | 5/2000 |
| EP | 1 007 529 B1 | 6/2000 |
| EP | 1 022 294 B1 | 7/2000 |
| EP | 1043388 B1 | 10/2000 |
| EP | 1043389 B1 | 10/2000 |
| EP | 0703243 B1 | 12/2000 |
| EP | 1021156 B1 | 2/2002 |
| EP | 1 236 748 A1 | 9/2002 |
| EP | 1506765 B1 | 2/2005 |
| EP | 1162257 B1 | 2/2006 |
| EP | 1520004 B1 | 12/2006 |
| EP | 1 881 017 A2 | 1/2008 |
| EP | 1997874 A1 | 3/2008 |
| EP | 1950232 A1 | 7/2008 |
| EP | 1699429 B1 | 10/2008 |
| EP | 2014757 A1 | 1/2009 |
| EP | 1741775 B1 | 4/2009 |
| EP | 2 072 531 A1 | 6/2009 |
| EP | 2 138 560 B1 | 12/2009 |
| EP | 1877171 B1 | 3/2010 |
| FR | 2856073 A1 | 12/2004 |
| FR | 2 908 135 A1 | 5/2008 |
| FR | 2 927 083 A1 | 8/2009 |
| GB | 1137741 | 12/1968 |

(56) References Cited

FOREIGN PATENT DOCUMENTS

| | | |
|---|---|---|
| GB | 1322536 A | 7/1973 |
| GB | 1355998 A | 6/1974 |
| GB | 1464616 A | 2/1977 |
| GB | 2322137 A | 8/1998 |
| GB | 2432844 A | 6/2007 |
| GB | 2432852 A | 6/2007 |
| JP | 57-082145 | 5/1982 |
| JP | 61-31497 A | 2/1986 |
| JP | 6157253 | 6/1994 |
| JP | 6-298866 | 10/1994 |
| JP | 6298866 | 10/1994 |
| JP | 6-315622 | 11/1994 |
| JP | 9249892 | 9/1997 |
| JP | 11-343449 | 12/1999 |
| JP | 2000017299 | 1/2000 |
| JP | 2002-526611 | 8/2002 |
| JP | 2002285019 | 10/2002 |
| JP | 2004-107233 | 4/2004 |
| JP | 2005-120045 | 5/2005 |
| JP | 2005-532304 | 10/2005 |
| JP | 2008208051 | 9/2008 |
| JP | 2010-47713 | 3/2010 |
| JP | 2011-195809 | 10/2011 |
| WO | WO 91/06637 | 5/1991 |
| WO | WO 92/06162 | 4/1992 |
| WO | WO 92/10433 | 6/1992 |
| WO | WO 93/02118 | 2/1993 |
| WO | WO 93/11214 | 6/1993 |
| WO | WO 93/11214 A1 | 6/1993 |
| WO | WO 93/19038 | 9/1993 |
| WO | WO 93/19146 | 9/1993 |
| WO | WO 94/09099 | 4/1994 |
| WO | WO 95/10591 | 4/1995 |
| WO | WO 95/26393 | 10/1995 |
| WO | WO 95/26710 A1 | 10/1995 |
| WO | WO 96/35645 A1 | 11/1996 |
| WO | WO 96/37530 A1 | 11/1996 |
| WO | WO 97/45510 A1 | 12/1997 |
| WO | WO 98/18352 A1 | 5/1998 |
| WO | WO 98/35002 | 8/1998 |
| WO | WO 98/35003 | 8/1998 |
| WO | WO 98/35004 | 8/1998 |
| WO | WO 98/35005 | 8/1998 |
| WO | WO 98/35006 | 8/1998 |
| WO | WO 98/49260 A1 | 11/1998 |
| WO | WO 99/02663 | 1/1999 |
| WO | WO 99/05082 | 2/1999 |
| WO | WO 99/05084 | 2/1999 |
| WO | WO 99/05241 | 2/1999 |
| WO | WO 99/05242 | 2/1999 |
| WO | WO 99/05243 | 2/1999 |
| WO | WO 99/05244 | 2/1999 |
| WO | WO 99/07656 | 2/1999 |
| WO | WO 99/20726 | 4/1999 |
| WO | WO 99/27083 | 6/1999 |
| WO | WO 99/36470 A1 | 7/1999 |
| WO | WO 00/12661 A1 | 3/2000 |
| WO | WO 00/15180 A1 | 3/2000 |
| WO | WO 00/18868 A1 | 4/2000 |
| WO | WO 00/20470 | 4/2000 |
| WO | WO 00/23548 | 4/2000 |
| WO | WO 00/23549 | 4/2000 |
| WO | WO 00/36076 A1 | 6/2000 |
| WO | WO 00/47708 | 8/2000 |
| WO | WO 01/24779 A1 | 4/2001 |
| WO | WO 01/32816 A1 | 5/2001 |
| WO | WO 01/42408 A2 | 6/2001 |
| WO | WO 02/38715 A2 | 5/2002 |
| WO | WO 02/044686 A2 | 6/2002 |
| WO | WO 03/042262 A2 | 5/2003 |
| WO | WO 03/095597 A1 | 11/2003 |
| WO | WO 2004/046301 A1 | 6/2004 |
| WO | WO 2004/048418 A2 | 6/2004 |
| WO | WO 2005/012378 A1 | 2/2005 |
| WO | WO 2005/051343 A1 | 6/2005 |
| WO | WO 2005/059023 A1 | 6/2005 |
| WO | WO 2005/068552 A1 | 7/2005 |
| WO | WO 2006/002565 A1 | 1/2006 |
| WO | WO 2006/007945 A1 | 1/2006 |
| WO | WO 2006/026406 A2 | 3/2006 |
| WO | WO 2006/119162 A1 | 11/2006 |
| WO | WO 2007/140267 A1 | 12/2007 |
| WO | WO 2008/089262 A1 | 7/2008 |
| WO | WO 2008/144744 A2 | 11/2008 |
| WO | WO 2008/147940 A2 | 12/2008 |
| WO | WO 2009/006603 A1 | 1/2009 |
| WO | WO 2009/087525 A1 | 7/2009 |
| WO | WO 2009/156233 A1 | 12/2009 |
| WO | WO 2010/057977 A1 | 5/2010 |
| WO | WO 2010/065482 A1 | 6/2010 |
| WO | WO 2010/065483 A1 | 6/2010 |
| WO | WO 2010/079466 A2 | 7/2010 |
| WO | WO 2010/079467 A2 | 7/2010 |
| WO | WO 2010/144575 A1 | 12/2010 |
| WO | WO 2011/008272 A1 | 1/2011 |
| WO | WO 2011/014783 A1 | 2/2011 |
| WO | WO 2011/017223 A1 | 2/2011 |
| WO | WO 2011/025624 A1 | 3/2011 |
| WO | WO 2011/044490 A1 | 4/2011 |
| WO | WO 2011/135313 A1 | 11/2011 |
| WO | WO 2012/000609 A1 | 1/2012 |

OTHER PUBLICATIONS

Willett et al., "Initiator Effects in Reactive Extrusion of Starch-Polyacrylamide Graft Copolymers," Wiley InterScience, Received May 28, 2004; Accepted Feb. 22, 2005, pp. 52-58.
Water Purification handbook, Chapter 25, Deposit and Scale Control-Cooling System, retrieved from: http://www.gewater.com/handbook/cooling_water_system.ch_25_deposit.jsp.
English Abstract for European Publication No. 0628655 A1.
English Abstract for European Publication No. 0725131 A1.
English Translation for European Publication No. 1021156 A1.
English Abstract for European Publication No. 1043388 A1.
English Abstract for European Publication No. 1043389 A1.
English Abstract for European Publication No. 1506765 A1.
English Abstract for European Publication No. 1520004 A1.
English Abstract for European Publication No. 1699429 A1.
English Translation for European Publication No. 1877171 A1.
English Abstract for French Publication No. 2856073 A1.
English Abstract for Japanese Publication No. 2000017299 A1.
English Abstract for Japanese Publication No. 2002285019 A1.
English Abstract for Japanese Publication No. 2008208051 A1.
English Abstract for Japanese Publication No. 6157253 A1.
English Abstract for Japanese Publication No. 6298866 A1.
English Abstract for Japanese Publication No. 9249892 A1.
Pal, S., et al., "Cationic starch: an effective flocculating agent," Carbohydrate Polymers, 2005, 59, pp. 417-423.
English Translation of Japanese Office Action mailed Sep. 25, 2012.
International Search Report for Application No. PCT/EP2012/071741; Completion Date Nov. 14, 2012.
International Search Report for Application No. PCT/EP2012/071742; Completion Date Nov. 14, 2012.
English Abstract of Chinese Publication No. CN 101830015 A.
English Abstract of Chinese Publication No. CN 101863540 A.
English Abstract of Chinese Publication No. CN 102146150 A.
English Translation of European Publication No. EP 0 725 131 A1.
English Translation of European Publication No. EP 2 072 531 A1.
English Translation of French Publication No. FR 2 908 135 A1.
English Translation of French Publication No. FR 2 927 083 A1.
English Abstract of Japanese Publication No. JP 6-298866 A.
English Abstract of Japanese Publication No. JP 2010-47713 A.
English Abstract of Japanese Publication No. JP 2011-195809 A.
Rosen, "Geminis: A new generation of surfactants," Chemtech, pp. 30-33 (Mar. 1993).
"Gemini Surfactants: A New Class of Self-Assembling Molecules," J. American Chemical Soc., vol. 115, pp. 10083-10090 (1993).
Kirk Othmer Encyclopedia of Chemical Technology, 3rd Ed, vol. 7, pp. 430-447 (John Wiley & Sons, Inc., 1979).

(56) References Cited

OTHER PUBLICATIONS

Kroschwitz, J.I.; Concise Encyclopedia of Polymer Science & Engineering, Ed., Wiley-Interscience, New York, p. 436 (1990).
Mark, Herman F., Concise Encyclopedia of Polymer Science and Technology, 3rd Ed., vol. 11, Wiley-Interscience, New York, p. 380 (2004).
Odian, George; Principles of Polymerization, 2nd Ed., Wiley-Interscience, New York, p. 424 (1970).
Odian, Principles of Polymerization, 2nd Ed., John Wiley & Sons, p. 226, New York (1981).
Wurzburg, Modified Starches: Properties and Uses, Grafted Starches, Chpt. 10, pp. 149-172, CRC Press, Boca Raton (1986).
Dubois et al, "Colorimetric Method for Determination of Sugars and Related Substances," Analytical Chemistry, vol. 28, No. 3, pp. 350-356 ( Mar. 1956).
Kwei-Ping, et al, "Chain Transfer constant of Vinylpyrrolidone with Dextran," Institute of Polymer Research, vol. 66, pp. 828-829, May 1962.
European Search Report for EP Application No. 06015025.7; Nov. 13, 2006.
European Search Report for EP Application No. 07014413.4; Nov. 6, 2007.
European Search Report for EP Application No. 07014412.6; Oct. 18, 2007.
European Search Report for EP Application No. 07014412.6; Jan. 23, 2008.
European Search Report for EP Application No. 09175465.5; Jan. 14, 2010.
Questel QPatents Abstract for Japanese Patent Publication 11-343449.
Chinese Office Action Action mailed Jul. 1, 2010 for Patent Application No. 200710169190.X.
International Search Report for PCT Application No. US2010/043919; Completed Sep. 22, 2010.
International Search Report for PCT Application No. US2010/043930; Completed Sep. 23, 2010.
International Search Report and Written Opinion for Application No. PCTEP2011/073928; Completion Date Jan. 18, 2012.
European Search Report for Application No. 11158599.8; Completion Date Aug. 11, 2011.
Shen, et al, "Graft Copolymers of Vinyl Pyrrolidone on Dextran," Journal of Polymer Science, vol. 53, pp. 81-85 (1961).
Kahya, et al, "A Novel Copolymer: Starch-g-Polyvinylpyrrolidone," Starch/Starke 61 (2009), pp. 267-274.
English QPatent Abstract for European Patent Publication No. 0 577 519 A1.
English Abstract for Japanese Patent Publication No. JP 2005/120045.
European Search Report for Application No. 12154675.8; Completion Date May 14, 2012.
European Search Report for Application No. 12154684.0; Completion Date May 14, 2012.
English Abstract for Japanese Patent Publication No. JP 57-082145.
English Translation of Japanese Office Action mailed Jun. 5, 2012 (Application No. 2006-198098).
English Translation of Japanese Office Action mailed Oct. 22, 2013 for Application No. 2012-523097.
English Abstract of Japanese Publication No. 2004-107233.
Office Action mailed Apr. 9, 2014 for U.S. Appl. No. 11/780,494.
English Translation of Japanese Publication No. 61-31497 A.

* cited by examiner

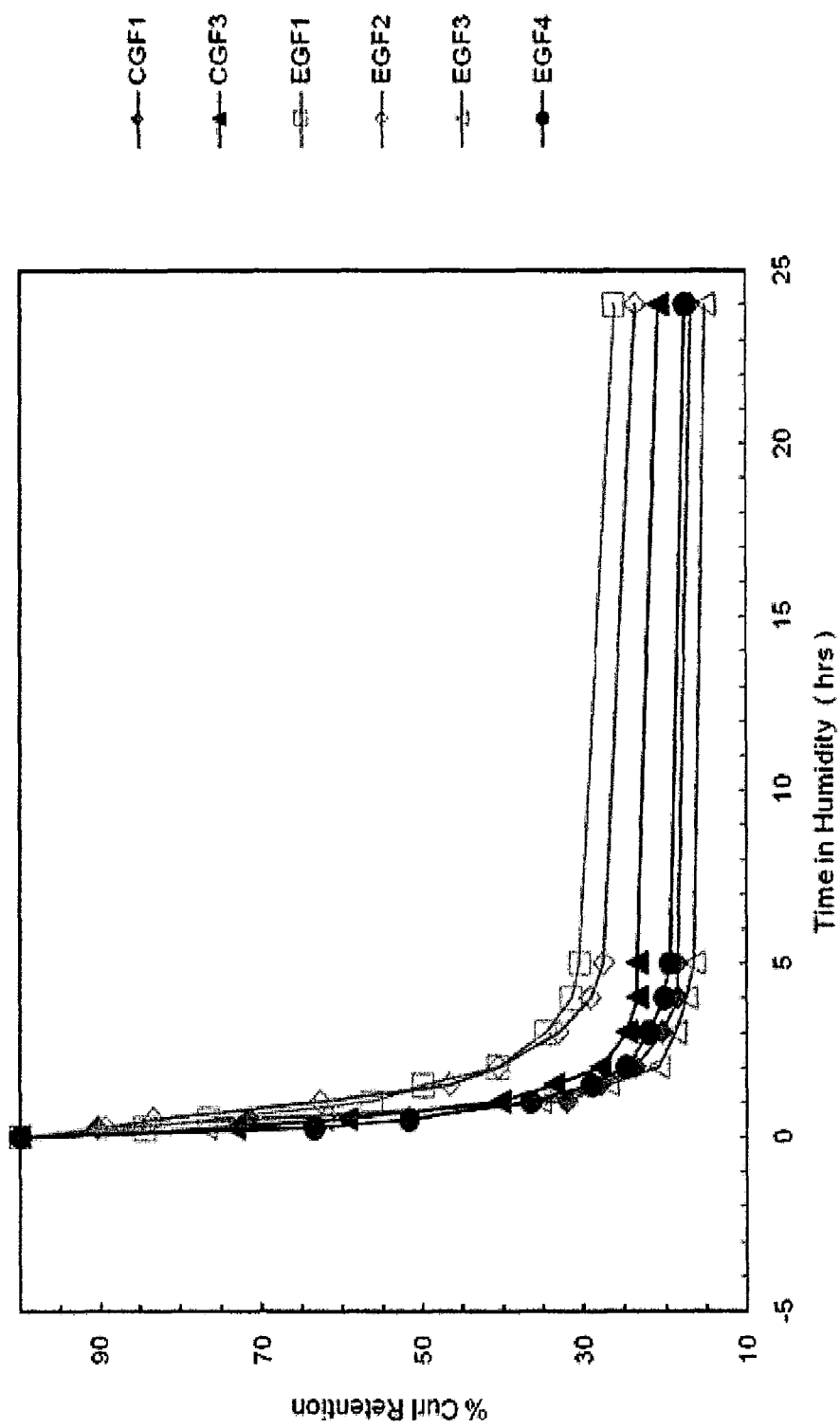

HYBRID COPOLYMER COMPOSITIONS FOR PERSONAL CARE APPLICATIONS

This application is a National Phase Application of PCT Application No. PCT/US2010/043949, filed Jul. 30, 2010, and claims the benefit of priority to U.S. patent application Ser. No. 12/533,802 filed Jul. 31, 2009, EP 09175465.5, filed Nov. 10, 2009, and Ser. No. 12/689,844, filed Jan. 19, 2010, which claims the benefit of priority to U.S. patent application Ser. No. 11/458,180 filed Jul. 18, 2006, now U.S. Pat. No. 7,666,963, which claims priority to U.S. Provisional Patent Application No. 60/701,380, filed Jul. 21, 2005. All of these applications are incorporated by reference in their entireties herein.

FIELD OF THE INVENTION

The present invention is relates to hybrid copolymer compositions and hybrid copolymers derived therefrom and their use in personal care compositions. More specifically, the invention relates to hybrid copolymer compositions including at least one naturally derived hydroxyl containing chain transfer agent and a naturally derived hydroxyl containing chain transfer agent as an end group in personal care compositions.

BACKGROUND

A number of attempts have been made in the past to use natural materials as polymeric building blocks. These have mainly centered on grafting natural materials such as sugars and starches with synthetic monomers. For example, U.S. Pat. Nos. 5,854,191, 5,223,171, 5,227,446 and 5,296,470 disclose the use of graft copolymers in cleaning applications.

Conventional graft copolymers have been produced by selectively generating initiation sites (e.g., free radicals) for the growth of monomer side chains from the saccharide or polysaccharide backbone (CONCISE ENCYCLOPEDIA OF POLYMER SCIENCE AND ENGINEERING, J. I. Kroschwitz, ed., Wiley-Interscience, New York, p. 436 (1990)). These grafting techniques typically use Fe(II) salts such as ferrous sulfate or Ce(IV) salts (e.g., cerium nitrate or cerium sulfate) to create those initiation sites on the saccharide or polysaccharide backbone (see, e.g., U.S. Pat. No. 5,304,620). Such redox processes are not easily controlled and are inefficient. Also, cerium salts tend to be left in the resulting solution as unwanted byproducts, thereby presenting a potential negative effect on performance. Therefore, there is a need for natural materials as polymeric building blocks that do not provide those problems associated with graft copolymers, in particular for personal care applications.

SUMMARY OF THE INVENTION

Hybrid copolymer compositions and the hybrid copolymers derived therefrom contain a portion of a naturally occurring oligomer or polymer and a moiety from a synthetically derived oligomer or polymer. One conventional method of making hybrid molecules utilizes water soluble monomers in the presence of an aqueous solution of a naturally derived, hydroxyl containing material as a chain transfer agent. Such a method is disclosed in US Patent application publication number US 2007-0021577 A1, which is wholly incorporated herein by reference. It has now been found that the hybrid copolymers according to the present invention can be prepared with a naturally derived hydroxyl containing chain transfer agent and still maintain the functionality of the synthetic polymers portion. In addition, new combinations of naturally derived hydroxyl containing chain transfer agents in personal care applications have been discovered that were heretofore previously unknown.

In another embodiment, the invention is directed to a personal care composition comprising a hybrid copolymer composition comprising a hybrid synthetic polymer and a hybrid copolymer comprising a synthetic polymer derived from at least one of a non-anionic ethylenically unsaturated monomer and a naturally derived hydroxyl containing chain transfer agent as an end group and an effective amount of a cosmetic or personal care additive.

BRIEF DESCRIPTION OF THE DRAWING

The invention is best understood from the following detailed description when read in connection with the accompanying drawings. Included in the drawings is the following figure:

The FIG. 1 is a graph of High Humidity Curl Retention of exemplary gel fixative formulations according to embodiments of the invention compared to gel fixative formulations of commercial grade materials.

DETAILED DESCRIPTION OF THE INVENTION

Generally, the hybrid copolymers of the instant invention are formed by preparing hybrid copolymer compositions in which chain transfer of a growing synthetic polymer chain to a naturally derived hydroxyl containing chain transfer agent occurs. It is believed that the reaction proceeds according to the following mechanism:

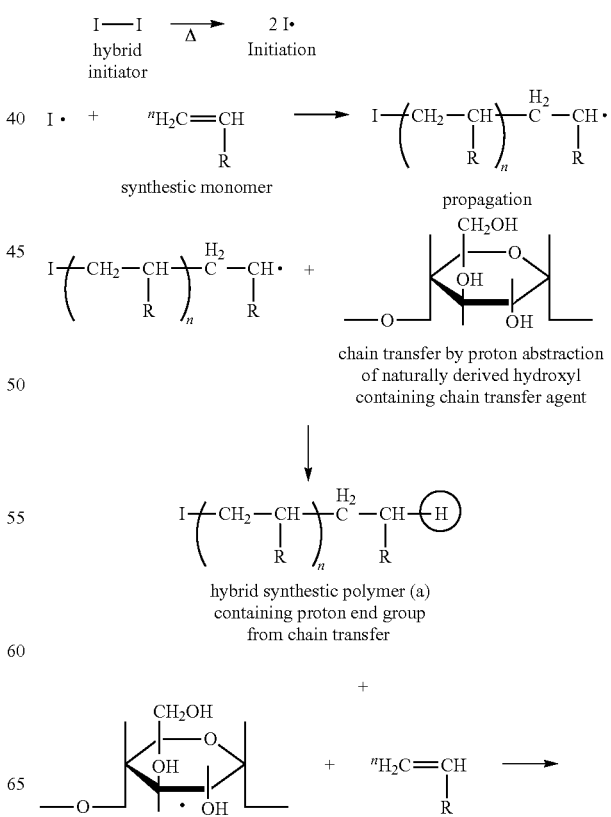

-continued

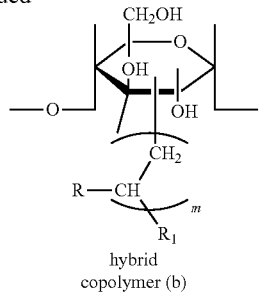
hybrid
copolymer (b)

chain transfer generates a new radical on the naturally derived hydroxyl containing chain transfer agent which then reacts with the synthetic monomer Hybrid copolymer composition = mixture of (a) and (b) with a range of wt % of (a) in the composition In the first step the initiator I forms free radicals which reacts with the monomer and initiates the synthetic polymer chain. This then propagates by reacting with several monomer moieties. Termination is then by chain transfer which abstracts a proton from the chain transfer agent. This terminates the hybrid synthetic polymer (a) and produces a free radical on the chain transfer agent. The chain transfer agent then reacts with several monomer moieties to form a species in which the naturally derived hydroxyl containing chain transfer agent is connected to the synthetic polymer chain. This species can then terminate by chain transfer mechanism or reaction with an initiator fragment or by some other termination such as combination or disproportionation reaction to produce the hybrid copolymer (b). If the termination is by chain transfer, then $R_1$ is H (abstracted from the chain transfer moiety) and the chain transfer agent can then initiate another chain.

Accordingly, as used herein and as shown in the above reaction, a "hybrid copolymer composition" is a mixture of (a) a hybrid synthetic copolymer and (b) a hybrid copolymer. The hybrid copolymer composition thus contains the two moieties, (a) and (b), with a minimum amount of the hybrid synthetic copolymer (a) since this component generates the chain transfer which leads to the formation of the hybrid copolymer (b). One skilled in the art will recognize that the hybrid copolymer composition may contain a certain amount of the unreacted chain transfer agent.

The term "hybrid copolymer", as defined herein, refers to a copolymer of synthetic monomers with an end group containing the naturally derived hydroxyl containing chain transfer agent which is a result of the hybrid synthetic copolymer chain transfer. The term "naturally derived hydroxyl containing chain transfer agent" as used herein, means a hydroxyl containing moiety obtained from plant sources directly or by enzymatic or fermentation processes. In an embodiment of the invention, the hybrid copolymer has the following structure:

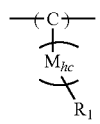

where C is a moiety derived from the naturally derived hydroxyl containing chain transfer agent, $M_{hc}$ is the synthetic portion of the hybrid copolymer derived from one or more ethylenically unsaturated monomers and $R_1$=H from chain transfer or I from reaction with the initiator radical or the naturally derived hydroxyl containing chain transfer agent or another moiety formed from a termination reaction.

In an embodiment, the attachment point between C and $M_{hc}$ is through an aldehyde group in C which results in the link between C and $M_{hc}$ being a carbonyl moiety. In another embodiment, when the naturally derived hydroxyl containing chain transfer agent is a saccharide/polysaccharide with an aldehyde group as the reducing end group, then the hybrid copolymer can be represented by the structure:

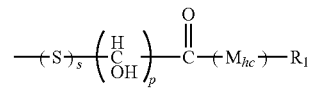

Where S is a saccharide repeat unit from the saccharide/polysaccharide chain transfer agent and s is an integer from 0 to 1000 and p is an integer that is 3, 4 or 5. In another embodiment, when the naturally derived hydroxyl containing chain transfer agent is an oxidized starch which contains aldehyde groups, the hybrid copolymer can be represented by the structure:

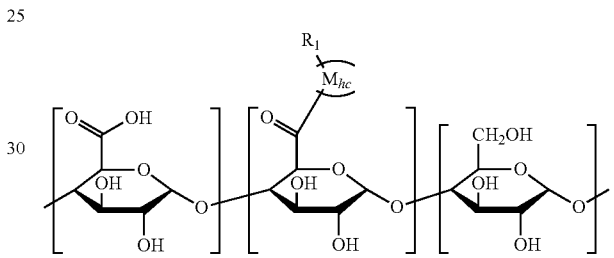

Also as used herein, the term "hybrid synthetic copolymer" is a synthetic polymer derived from synthetic monomers with a hybrid initiator fragment as one end group. The other end group is a proton resulting from chain transfer to the naturally derived hydroxyl containing chain transfer agent. As used herein, the term "synthetic monomer" means any ethylenically unsaturated monomer which can undergo free radical polymerization.

In an embodiment of the invention, an exemplary hybrid synthetic copolymer has the following structure:

Where I is the initiator fragment, H is the proton abstracted from the natural chain transfer agent and $M_{hsc}$ is the synthetic portion of the hybrid synthetic copolymer derived from one or more ethylenically unsaturated monomers. One skilled in the art will recognize that if one or more ethylenically unsaturated monomers are used, the average composition of $M_{hsc}$ and $M_{hc}$ will be the same.

One skilled in the art will recognize, that the minimum amount of the hybrid synthetic copolymer will depend on the relative amounts of synthetic monomer, initiator and naturally derived hydroxyl containing chain transfer agent.

Molecular weight of the hybrid synthetic polymer is determined by the relative amounts of synthetic monomer, initiator and naturally derived hydroxyl containing chain transfer agent.

Optionally, in an embodiment of the present invention, the weight average molecular weight of the hybrid copolymer composition may be less than about 500,000, preferably less than 300,000 and most preferably less than 100,000. In a further embodiment, the hybrid copolymer composition may be water soluble. For purposes of the present application, water soluble is defined as having a solubility of greater than about 0.1 grams per 100 grams of water at 25° C. and preferably 1 gram per 100 grams of water at 25° C.

In another embodiment, the hybrid synthetic copolymer will have a hybrid initiator fragment (I) and some of the hybrid copolymer chains will have a natural chain transfer agent at one end and a hybrid initiator fragment (where $R_1$ is I) at the other end of the synthetic polymer chain. As used herein, the term "hybrid initiator fragment" is any fragment of the hybrid initiator that gets incorporated into a synthetic polymer derived from a hybrid initiator. "Hybrid initiators" are free radical initiators or initiating system excluding metal ion based initiators or initiating systems. The hybrid initiators preferably are not free radical abstractors but promote chain transfer. Furthermore, preferably the hybrid initiator is water soluble. Exemplary hybrid initiators include, but are not limited to, peroxides, azo initiators as well as redox systems like tert-butyl hydroperoxide and erythorbic acid, peroxide such as persulfate and an amine such as hydroxylamine sulfate, persulfate and sodium formaldehyde sulfoxylate etc. The hybrid initiators may include both inorganic and organic peroxides. Suitable inorganic peroxides include sodium persulfate, potassium persulfate and ammonium persulfate. Azo initiators, such as water soluble azo initiators, may also be suitable hybrid initiators. Water soluble azo initiators include, but are not limited to, 2,2'-Azobis[2-(2-imidazolin-2-yl)propane]dihydrochloride, 2,2'-Azobis[2-(2-imidazolin-2-yl)propane]disulfate dihydrate, 2,2'-Azobis(2-methylpropionamidine)dihydrochloride, 2,2'-Azobis[N-(2-carboxyethyl)-2-methylpropionamidine]hydrate, 2,2'-Azobis{2-[1-(2-hydroxyethyl)-2-imidazolin-2-yl]propane}dihydrochloride, 2,2'-Azobis[2-(2-imidazolin-2-yl)propane], 2,2'-Azobis(1-imino-1-pyrrolidino-2-ethylpropane)dihydrochloride, 2,2'-Azobis{2-methyl-N-[1,1-bis(hydroxymethyl)-2-hydroxyethyl]propionamide}, 2,2'-Azobis[2-methyl-N-(2-hydroxyethyl)propionamide] and others. One skilled in the art will recognize that the hybrid initiator fragment incorporated into the hybrid synthetic copolymer will depend on the hybrid initiator used. For example, sodium persulfate, potassium persulfate and ammonium persulfate will incorporate sulfate initiator fragments, whereas an azo initiator, such as 2,2'-Azobis(2-methylpropionamidine)dihydrochloride, will incorporate a 2-methyl propane propionamidine hydrochloride fragment.

In an embodiment, I is preferably 0.01 to 20 mole % of $M_{hc}+M_{hsc}$ and more preferably I is 0.1 to 15 mole % of $M_{hc}+M_{hsc}$ and most preferably I is 1 to 10 mole % of $M_{hc}+M_{hsc}$.

Metal ion initiating systems, such as those containing Fe(II) salts or Ce(IV), are typically used to create graft copolymers. As noted previously, conventional graft copolymers are produced by selectively generating initiation sites (e.g., free radicals) for the growth of monomer side chains from an existing polymer backbone (CONCISE ENCYCLOPEDIA OF POLYMER SCIENCE AND ENGINEERING, J. I. Kroschwitz, ed., Wiley-Interscience, New York, p. 436 (1990)). Therefore, graft copolymers are defined as a backbone of a natural component such as a polysaccharide with one or more side chains derived from synthetic monomers.

In an embodiment of the invention, the naturally derived hydroxyl containing chain transfer agents include, but are not limited, to small molecules such as glycerol, citric acid, lactic acid, tartaric acid, gluconic acid, ascorbic acid, glucoheptonic acid. The naturally derived hydroxyl containing chain transfer agents may also include saccharides or derivatives thereof. Suitable saccharides include, for example, monosaccharides and disaccharides such as sugars, as well as larger molecules such as oligosaccharides and polysaccharides (e.g., maltodextrins, pyrodextrins and starches). In an embodiment of the invention, the naturally derived chain transfer agent is maltodextrin, pyrodextrin or a low molecular weight starch. It has been found that the chain transfer reaction does not work well when the chain transfer agent is not soluble in the system. For example, high molecular weight starches, such as those having molecular weights in the millions or those in granular form, are water dispersable and not water soluble. Accordingly, in embodiments of the invention, the average molecular weight of the chain transfer agent is preferably less than about 500,000 based on a starch standard. Starches having such exemplary molecular weights are water soluble. In another embodiment, the average molecular weight (Mw) of the chain transfer agent may be less than about 100,000. In yet another preferred embodiment, the weight average molecular weight of the chain transfer agent may be less than about 50,000. In yet another preferred embodiment, the weight average molecular weight of the chain transfer agent may be less than about 10,000. It has also been determined that for applications in which dispersancy and scale control is particularly desirable, a lower molecular weight, such as 10,000, of the chain transfer agent provides improved performance.

The molecular weight of the polysaccharide was determined by the procedure outlined below:

Eluent: 0.025M $NaH_2PO_4$, 0.025 M $Na_2HPO_4$ and 0.01M of Sodium Azide in HPLC grade water. This solution was filtered through a 0.2 μm filter.

Columns: 1×G6000PWxl 7.8 mm×30 cm, G4000PWxl 7.8×30 cm, G3000PWxl 7.8 mm×30 cm, Guard column is TSKgel Guard PWxl 6.0 mm×4 cm (all made by Tosoh Bioscience)

The column bank was controlled to 5° C. above ambient temperature. Usually 30° C.

Flow Rate: 1.0 ml/min

Detector: Refractive Index, Waters® Model 2414 Temperature controlled to 30° C.

Pump/Autosampler: Waters® e2695 Separation Module. Sample compartment temperature controlled to 25° C.

Primary Standards: HETA (Hydroxyethylstarch). Available from American Polymer Standards Corporation. (www.ampolymer.com)

5 standards. Prepare a 0.1% w/w in the mobile phase of each of the following:

| 1. | Mw | 9,600 | Mn | 5,400 |
| 2. | Mw | 25,900 | Mn | 10,600 |
| 3. | Mw | 51,100 | Mn | 34,300 |
| 4. | Mw | 114,300 | Mn | 58,000 |
| 5. | Mw | 226,800 | Mn | 95,900 |

Sample Preparation: The samples were prepared by dissolving the polymer in the mobile phase at a 0.1% concentration.

Injection Volume: 450 μl for the standard and sample.

The standards are injected and a first or second order calibration curve is built.

The curve with the best fit and within the range of the molecular weight of the unknown sample was then chosen.

Software: Empower® 2 by Waters Corporation

A calibration curve is first built with the samples of the standards. The molecular weight of the unknown sample is then determined by comparing its elution time with the elution time of the standards.

The naturally derived hydroxyl containing chain transfer agents also may include cellulose and its derivatives, as well as inulin and its derivatives, such as carboxymethyl inulin. The cellulosic derivatives include plant heteropolysaccharides commonly known as hemicelluloses which are by products of the paper and pulp industry. Hemicelluloses include xylans, glucuronoxylans, arabinoxylans, arabinogalactans, glucomannans, and xyloglucans. Xylans are the most common heteropolysaccharide and are preferred. In an embodiment of the invention, cellulosic derivatives such as heteropolysaccharides such as xylans may be present in an amount of from about 0.1% to about 98% by weight, based on the total amount of the hybrid copolymer. In an embodiment of this invention the naturally derived chain transfer agents may be maltodextrins, pyrodextrins and chemically modified versions of maltodextrins and pyrodextrins. In another embodiment, the naturally derived chain transfer agent may be cellulose of inulin or chemically modified cellulose or inulin or a heteropolysaccharide such as xylan or a lignin derivative, such as lignosulfonate.

The naturally derived chain transfer agents can be used as obtained from their natural source or they can be chemically modified. Chemical modification includes hydrolysis by the action of acids, enzymes, oxidizers or heat, esterification or etherification. The modified naturally derived chain transfer agents, after undergoing chemical modification may be cationic, anionic, non-ionic or amphoteric or hydrophobically modified. In an embodiment of the invention, the hybrid copolymer may optionally be formed by polymerization catalyzed by, for example, a non-metal based radical initiator system.

In an aspect of the present invention, the invention relates to an anionic hybrid copolymer composition. In an embodiment according to this aspect, the anionic hybrid copolymer composition comprises a hybrid synthetic copolymer and an anionic hybrid copolymer which is a synthetic polymer produced from at least one anionic ethylenically unsaturated monomer that is chain terminated, or has an end group, with a naturally derived hydroxyl containing chain transfer agent.

As used herein, the term "anionic ethylenically unsaturated monomer" means an ethylenically unsaturated monomer which is capable of introducing a negative charge to the anionic hybrid copolymer. These anionic ethylenically unsaturated monomers can include, but are not limited to, acrylic acid, methacrylic acid, ethacrylic acid, α-chloro-acrylic acid, α-cyano acrylic acid, β-methyl-acrylic acid (crotonic acid), α-phenyl acrylic acid, β-acryloxy propionic acid, sorbic acid, α-chloro sorbic acid, angelic acid, cinnamic acid, p-chloro cinnamic acid, β-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, muconic acid, 2-acryloxypropionic acid, 2-acrylamido-2-methyl propane sulfonic acid, vinyl sulfonic acid, sodium methallyl sulfonate, sulfonated styrene, allyloxybenzene sulfonic acid, vinyl phosphonic acid and maleic acid. Moieties such as maleic anhydride or acrylamide that can be derivatized (hydrolyzed) to moieties with a negative charge are also suitable. Combinations of anionic ethylenically unsaturated monomers can also be used. In an embodiment of the invention, the anionic ethylenically unsaturated monomer may preferably be acrylic acid, maleic acid, methacrylic acid, itaconic acid, 2-acrylamido-2-methyl propane sulfonic acid or mixtures thereof.

The anionic hybrid copolymer compositions may contain 1 to 99.5 weight percent of the naturally derived hydroxyl containing chain transfer agent based on the weight of the hybrid copolymer composition. Based on the conventional understanding of one of ordinary skill in the art, one would expect that the performance of the inventive anionic hybrid copolymer compositions would decrease as the weight percent of the chain transfer agent in the polymer increases. For example, polysaccharides have little to no performance as dispersants by themselves. Surprisingly, however, it has been found that when the chain transfer agent content of the polymer is greater than 75 weight percent, performance is still maintained. For example the dispersancy performance of the low anionic hybrid copolymer composition is unexpectedly good even when using high amounts, such as 80, 90, 95 or even 99 and 99.5 weight percent, of the polysaccharide as a chain transfer agent. Embodiments of the invention that include an anionic hybrid copolymer composition having greater than 75 up to and including 99.5 percent of natural hydroxyl chain transfer agent by weight are hereinafter referred to as "low anionic hybrid compositions".

Accordingly, low anionic hybrid copolymers comprise a naturally derived hydroxyl containing chain transfer agent as the terminating moiety, or end group. In embodiments of the invention, the chain transfer agent may optionally be present from greater than about 75% by weight to about 99.5%, from about 80 to about 99% by weight, from about 90 to about 99.5% and from about 95% to about 99.5%, based on the total weight of the low anionic hybrid copolymer composition.

In another aspect, the present invention relates to hybrid copolymer compositions that are non-anionic. A hybrid copolymer composition that is non-anionic, as used herein, is a mixture of a hybrid synthetic copolymer produced from at least one cationic ethylenically unsaturated monomer or at least one nonionic ethylenically unsaturated monomer and a hybrid copolymer that comprises a synthetic polymer produced from at least one cationic ethylenically unsaturated monomer or at least one nonionic ethylenically unsaturated monomer that is chain terminated, or has an end group, with a naturally derived hydroxyl containing chain transfer agent. As used herein, the term "cationic ethylenically unsaturated monomer" means an ethylenically unsaturated monomer which is capable of introducing a positive charge to the non-anionic hybrid copolymer composition. In an embodiment of the present invention, the cationic ethylenically unsaturated monomer has at least one amine functionality. Cationic derivatives of these non-anionic hybrid copolymer compositions may be formed by forming amine salts of all or a portion of the amine functionality, by quaternizing all or a portion of the amine functionality to form quaternary ammonium salts, or by oxidizing all or a portion of the amine functionality to form N-oxide groups.

As used herein, the term "amine salt" means the nitrogen atom of the amine functionality is covalently bonded to from one to three organic groups and is associated with an anion.

As used herein, the term "quaternary ammonium salt" means that a nitrogen atom of the amine functionality is covalently bonded to four organic groups and is associated with an anion. These cationic derivatives can be synthesized by functionalizing the monomer before polymerization or by functionalizing the polymer after polymerization. These cationic ethylenically unsaturated monomers include, but are not limited to, N,N dialkylaminoalkyl(meth)acrylate, N-alkylaminoalkyl(meth)acrylate, N,N dialkylaminoalkyl(meth) acrylamide and N-alkylaminoalkyl(meth)acrylamide, where the alkyl groups are independently $C_{1-18}$ aliphatic, cycloaliphatic, aromatic, or alkyl aromatic and the like. Aromatic amine containing monomers such as vinyl pyridine and vinyl imidazole may also be used. Furthermore, monomers such as vinyl formamide, vinyl acetamide and the like which generate amine moieties on hydrolysis may also be used. Preferably the cationic ethylenically unsaturated monomer is N,N-dimethylaminoethyl methacrylate, tert-butylaminoethylmethacrylate and N,N-dimethylaminopropyl methacrylamide.

Cationic ethylenically unsaturated monomers that may be used are the quarternized derivatives of the above monomers as well as diallyldimethylammonium chloride also known as dimethyldiallylammonium chloride, (meth)acrylamidopropyl trimethylammonium chloride, 2-(meth)acryloyloxy ethyl trimethyl ammonium chloride, 2-(meth)acryloyloxy ethyl trimethyl ammonium methyl sulfate, 2-(meth)acryloyloxyethyltrimethyl ammonium chloride, N,N-Dimethylaminoethyl (meth)acrylate methyl chloride quaternary, methacryloyloxy ethyl betaine as well as other betaines and sulfobetaines, 2-(meth)acryloyloxy ethyl dimethyl ammonium hydrochloride, 3-(meth)acryloyloxy ethyl dimethyl ammonium hydroacetate, 2-(meth)acryloyloxy ethyl dimethyl cetyl ammonium chloride, 2-(meth)acryloyloxy ethyl diphenyl ammonium chloride and others.

As used herein, the term "nonionic ethylenically unsaturated monomer" means an ethylenically unsaturated monomer which does not introduce a charge in to the non-anionic hybrid copolymer composition. These nonionic ethylenically unsaturated monomers include, but are not limited to, acrylamide, methacrylamide, N alkyl(meth)acrylamide, N,N dialkyl(meth)acrylamide such as N,N dimethylacrylamide, hydroxyalkyl(meth)acrylates, alkyl(meth)acrylates such as methylacrylate and methylmethacrylate, vinyl acetate, vinyl morpholine, vinyl pyrrolidone, vinyl caprolactam, vinyl formamide, vinyl acetamide, ethoxylated alkyl, alkaryl or aryl monomers such as methoxypolyethylene glycol (meth)acrylate, allyl glycidyl ether, allyl alcohol, glycerol (meth)acrylate, monomers containing silane, silanol and siloxane functionalities and others. The nonionic ethylenically unsaturated monomer is preferably water soluble. The preferred nonionic ethylenically unsaturated monomers are acrylamide, methacrylamide, N methyl(meth)acrylamide, N,N dimethyl (meth)acrylamide, vinyl pyrrolidone, vinyl formamide, vinyl acetamide and vinyl caprolactam.

The cationic or non-ionic hybrid copolymer composition has a naturally derived hydroxyl containing chain transfer agent as the terminating moiety, or end group. This chain transfer agent is preferably present from about 0.1% by weight to about 98%, more preferably from about 10 to about 95% and most preferably from about 20 to about 75% by weight, based on the total weight of the cationic or non-ionic hybrid copolymer composition.

The hybrid copolymer compositions can be used in cosmetic and personal care compositions. Hybrid copolymer compositions useful in cosmetic and personal care compositions include both anionic and non-anionic hybrid copolymer compositions. Cosmetic and personal care compositions include, for example, skin lotions and creams, skin gels, serums and liquids, facial and body cleansing products, shaving preparations, wipes, liquid and bar soap, color cosmetic formulations, make-ups, foundations, sun care products, sunscreens, sunless tanning formulations, shampoos, conditioners, hair color formulations, hair relaxers, products with AHA and BHA and hair fixatives such as sprays, gels, mousses, pomades, and waxes, including low VOC hair fixatives and sunscreens. These cosmetic and personal care compositions may be in any form, including without limitation, emulsions, gels, liquids, sprays, solids, mousses, powders, wipes, or sticks.

The cosmetic and personal care compositions contain suitable additives. Such additives can optionally include "cosmetic and personal care actives". Suitable cosmetic and personal care active agents include, for example, sunscreen agents or actives, aesthetic enhancers, conditioning agents, anti-acne agents, antimicrobial agents, anti-inflammatory agents, analgesics, anti-erythemal agents, antiruritic agents, antiedemal agents, antipsoriatic agents, antifungal agents, skin protectants, vitamins, antioxidants, scavengers, antiirritants, antibacterial agents, antiviral agents, antiaging agents, protoprotection agents, hair growth enhancers, hair growth inhibitors, hair removal agents, antidandruff agents, anti-seborrheic agents, exfoliating agents, wound healing agents, anti-ectoparacitic agents, sebum modulators, immunomodulators, hormones, botanicals, moisturizers, astringents, cleansers, sensates, antibiotics, anesthetics, steroids, tissue healing substances, tissue regenerating substances, hydroxyalkyl urea, amino acids, peptides, minerals, ceramides, biohyaluronic acids, vitamins, skin lightening agents, self tanning agents, coenzyme Q10, niacinimide, capcasin, caffeine, and any combination of any of the foregoing.

Suitable sunscreen agents or actives useful in the present invention include any particulate sunscreen active that absorbs, scatters, or blocks ultraviolet (UV) radiation, such as UV-A and UV-B. Non-limiting examples of suitable particulate sunscreen agents include clays, agars, guars, nanoparticles, native and modified starches, modified cellulosics, zinc oxide, and titanium dioxide and any combination of the foregoing. Modified starches include, for example, DRY-FLO®PC lubricant (aluminum starch octenylsuccinate), DRY-FLO®AF lubricant (corn starch modified), DRY-FLO® ELITE LL lubricant (aluminum starch octenylsuccinate (and) lauryl lysine), DRY-FLO® ELITE BN lubricant (aluminum starch octenylsuccinate (and) boron nitride), all commercially available from National Starch and Chemical Company.

The sunscreen agents may include those that form a physical and/or chemical barrier between the UV radiation and the surface to which they are applied. Non-limiting examples of suitable sunscreen agents include ethylhexyl methoxycinnamate (octinoxate), ethylhexyl salicylate (octisalate), butyl-methoxydibenzoylmethane, methoxydibenzoylmethane, avobenzone, benzophenone-3 (oxybenzone), octocrylene, aminobenzoic acid, cinoxate, dioxybenzone, homosalate, methyl anthranilate, octocrylene, octisalate, oxybenzone, padimate O, phenylbenzimidazole sulfonic acid, sulisobenzone, trolamine salicylate and any combination of any of the foregoing.

Other optional additives for the cosmetic and personal care compositions can optionally include one or more aesthetic enhancers (i.e., a material that imparts desirable tactile, visual, taste and/or olfactory properties to the surface to which the composition is applied) and can be either hydrophilic or hydrophobic. Non-limiting examples of commercial aesthetic enhancers together with their INCI names that are optionally suitable for use in the present invention include PURITY®21C starch (zea maize (corn) starch) and TAPIOCA PURE (tapioca starch), as well as combinations thereof, that are available from the National Starch and Chemical Company. The cosmetic and personal care compositions may also optionally include aesthetic enhancers such as aluminum starch octenyl succinate, corn starch modified, aluminum starch octenylsuccinate (and) lauroyl lysine, and aluminum starch octenylsuccinate (and) boron nitride. Thickeners and rheology modifiers may also be present, and are intended to include without limitation acrylates/steareth-20 itaconate copolymer, acrylates/ceteth-20 itaconate copolymer, potato starch modified, hydroxypropyl starch phosphate, acrylates/aminoacrylates/C10-30 alkyl PEG-20 itaconate copolymer, carbomer, acrylates/C10-30 alkyl acrylate crosspolymer, hydroxypropylcellulose, hydroxyethylcellulose, sodium carboxymethylcellulose, polyacrylamide (and) C13-14 isoparaffin (and) laureth-7, acrylamides copolymer (and) mineral oil (and) C13-14 isoparaffin (and) polysorbate 85, hydroxyethylacrylate/sodium acrylol dimethyltaurate copolymer, and hydroxyethylacrylate/sodium acrylol dimethyltaurate copolymer. In an embodiment of the invention, the personal care compositions can further include materials such as natural and synthetic polymers in addition to the inventive polymers of the present invention.

Another optional additive may be suitable conditioning agents include, but are not limited to, cyclomethicone; petrolatum; dimethicone; dimethiconol; silicone, such as cyclopentasiloxane and diisostearoyl trimethylolpropane siloxy silicate; sodium hyaluronate; isopropyl palmitate; soybean oil; linoleic acid; PPG-12/saturated methylene diphenyldiisocyanate copolymer; urea; amodimethicone; trideceth-12; cetrimonium chloride; diphenyl dimethicone; propylene glycol; glycerin; hydroxyalkyl urea; tocopherol; quaternary amines; and any combination thereof.

Yet another optional additive for the cosmetic and personal care compositions can optionally include one or more adjuvants, such as pH adjusters, emollients, humectants, conditioning agents, moisturizers, chelating agents, propellants, rheology modifiers and emulsifiers such as gelling agents, colorants, fragrances, odor masking agents, UV stabilizer, preservatives, and any combination of any of the foregoing. Examples of pH adjusters include, but are not limited to, aminomethyl propanol, aminomethylpropane diol, triethanolamine, triethylamine, citric acid, sodium hydroxide, acetic acid, potassium hydroxide, lactic acid, and any combination thereof.

Still yet another additive for the cosmetic and personal care compositions may also contain preservatives. Suitable preservatives include, but are not limited to, chlorophenesin, sorbic acid, disodium ethylenedinitrilotetraacetate, phenoxyethanol, methylparaben, ethylparaben, propylparaben, phytic acid, imidazolidinyl urea, sodium dehydroacetate, benzyl alcohol, methylchloroisothiazolinone, methylisothiazolinone, and any combination thereof. In an embodiment of the invention, the cosmetic and personal care composition generally contains from about 0.001% to about 20% by weight of preservatives, based on 100% weight of total composition. In another embodiment, the composition contains from about 0.1% to about 10% by weight of preservatives, based on 100% weight of total composition.

More optional additives for the cosmetic and personal care compositions may optionally contain thickeners or gelling agents. Examples of such gelling agents include, but are not limited to, synthetic polymers such as the acrylic-based Carbopol® series of thickeners available from Lubirzol, Wickliffe, Ohio USA, and associative thickeners such as Aculyn™, available from Rohm & Haas, Philadelphia, Pa. Other exemplary gelling agents include, cellulosic thickeners, such as derivatized hydroxyethyl cellulose and methyl cellulose, starch-based thickeners, such as acetylated starch, and naturally occurring gums, such as agar, algin, gum arabic, guar gum and xanthan gum. Thickeners and rheology modifiers may also include without limitation acrylates/steareth-20 itaconate copolymer, acrylates/ceteth-20 itaconate copolymer, potato starch modified, hydroxypropyl starch phosphate, acrylates/aminoacrylates/C10-30 alkyl PEG-20 itaconate copolymer, carbomer, acrylates/C10-30 alkyl acrylate crosspolymer, hydroxypropylcellulose, hydroxyethylcellulose, sodium carboxymethylcellulose, polyacrylamide (and) C13-14 isoparaffin (and) laureth-7, acrylamides copolymer (and) mineral oil (and) C13-14 isoparaffin (and) polysorbate 85, hydroxyethylacrylate/sodium acrylol dimethyltaurate copolymer, and hydroxyethylacrylate/sodium acrylol dimethyltaurate copolymer.

In further embodiments, even more additional additives for the cosmetic and personal care compositions may further include fixatives, including without limitation, polyoxythylenated vinyl acetate/crotonic acid copolymers, vinyl acetate crotonic acid (90/10) copolymers, vinyl acetate/crotonic acid/vinyl neodecanoate terpolymers, N-octylacrylamide/methylacrylate/hydroxypropyl methacrylate/acrylic acid/tert-butylaminoethyl methacrylate copolymers, and methyl vinyl ether/maleic anhydride (50/50) copolymers monoesterified with butanol or ethanol, acrylic acid/ethyl acrylate/N-tert-butyl-acrylamide terpolymers, and poly (methacrylic acid/acrylamidomethyl propane sulfonic acid), acrylates copolymer, octylacrylamide/acrylates/butylamino ethyl methacrylate copolymer, acrylates/octylacrylamide copolymer, VA/crotonates/vinyl Neodeanoate copolymer, poly(N-vinyl acetamide), poly(N-vinyl formamide), corn starch modified, sodium polystyrene sulfonate, polyquaterniums such as polyquaternium-4, polyquaternium-7, polyquaternium-10, polyquaternium-11, polyquarternium-16, polyquaternium-28, polyquaternium-29, polyquaternium-46, polyether-1, polyurethanes, VA/acrylates/lauryl methacrylate copolymer, adipic acid/dimethylaminohydroxypropyl diethylene AMP/acrylates copolymer, methacrylol ethyl betaine/acrylates copolymer, PVP/dimethylaminoethylmethacrylate copolymer, PVP/DMAPA acrylates copolymer, PVP/vinylcaprolactam/DMAPA acrylates copolymer, vinyl caprolactam/PVP/dimethylaminoethyl methacrylate copolymer, VA/butyl maleate/isobornyl acrylate copolymer, VA/crotonates copolymer, acrylate/acrylamide copolymer, VA/crotonates/vinyl propionate copolymer, vinylpyrrolidone/vinyl acetate/vinyl propionate terpolymers, VA/crotonates, cationic and amphoteric guar, polyvinylpyrrolidone (PVP), polyvinylpyrrolidone/vinyl acetate copolymer, PVP acrylates copolymer, vinyl acetate/crotonic acid/vinyl proprionate, acrylates/acrylamide, acrylates/octylacrylamide, acrylates/hydroxyacrylates copolymer, and alkyl esters of polyvinylmethylether/maleic anhydride, diglycol/cyclohexanedimethanol/isophthalates/sulfoisophthalates copolymer, vinyl acetate/butyl maleate and isobornyl acrylate copolymer, vinylcaprolactam/PVP/dimethylaminoethyl methacrylate, vinyl acetate/alkylmaleate half ester/N-substituted acrylamide terpolymers, vinyl caprolactam/vinylpyrrolidone/methacryloamidopropyl trimethylammonium chloride terpolymer, methacrylates/acrylates copolymer/amine salt, polyvinylcaprolactam, polyurethanes, hydroxypropyl guar, hydroxypropyl guar hydroxypropyl trimmonium chloride, poly (methacrylic acid/acrylamidomethyl propane sulfonic acid, poylurethane/acrylate copolymers and hydroxypropyl trimmonium chloride guar, particularly acrylates copolymer, octylacrylamide/acrylates/butylaminoethyl methacrylate copolymer, acrylates/octylacrylamide copolymer, VA/crotonates/vinyl Neodeanoate copolymer, poly(N-vinyl acetamide), poly(N-vinyl formamide), polyurethane, corn starch modified, sodium polystyrene sulfonate, polyquaternium-4, polyquaternium-10, and polyurethane/acrylates copolymer.

Other optional additives may also be incorporated into the hair compositions of this invention to provide certain modifying properties to the composition. Included among these additives are silicones and silicone derivatives; humectants; moisturizers; plasticizers, such as glycerine, glycol and phthalate esters and ethers; emollients, lubricants and penetrants, such as lanolin compounds; fragrances and perfumes; UV absorbers; dyes, pigments and other colorants; anticorrosion agents; antioxidants; detackifying agents; combing aids and conditioning agents; antistatic agents; neutralizers; glossifiers; preservatives; proteins, protein derivatives and amino acids; vitamins; emulsifiers; surfactants; viscosity modifiers, thickeners and rheology modifiers; gelling agents; opacifiers; stabilizers; sequestering agents; chelating agents; pearling agents; aesthetic enhancers; fatty acids, fatty alcohols and triglycerides; botanical extracts; film formers; and clarifying agents. Such additives are commonly used in hair cosmetic compositions known heretofore. These additives are present in small, effective amounts to accomplish their function, and generally will comprise from about 0.01 to 10% by weight each, and from about 0.01 to 20% by weight total, based on the weight of the composition.

In an embodiment, personal care composition includes a nonionic ethylenically unsaturated monomer which is a vinyl lactam or vinyl lactam with a co-monomer, such as a non-anionionic co-monomer. In a further embodiment, the nonionic ethylenically unsaturated monomer is N-vinyl pyrrolidone or N-vinyl formamide.

In yet another embodiment, the personal care composition includes a naturally derived hydroxyl containing chain transfer agent which is a polysaccharide. In a further embodiment, the polysaccharide can be hydrolyzed starch having a DE of greater than 5. In an even further embodiment, the polysaccharide is maltodextrin having a DE greater than 5. In an embodiment of the invention, the maltodextrin has a DE of 10 or greater.

In a further embodiment, the naturally derived hydroxyl containing chain transfer agent comprises maltodextrin or corn syrup solids. In an embodiment of the invention, the maltodextrin preferably has a dextrose equivalent (DE) of greater than 5. In another embodiment, the maltodextrin has a DE of 10 or greater.

The naturally derived hydroxyl containing chain transfer agent of the hybrid copolymer in the hair cosmetic composition may be present in an amount of about 35% to about 90% by weight of the hybrid copolymer, preferably in an amount of 50% by weight. Similarly, the ethylenically unsaturated nonionic monomer may be present in an amount of about 10% to about 65% by weight of the hybrid copolymer, preferably in an amount of 50% by weight. In a further embodiment, the naturally derived hydroxyl containing chain transfer agent and the ethylenically unsaturated nonionic monomer may be present in the hair cosmetic composition a 50/50 ratio.

In an embodiment of the invention, the cosmetic and personal care composition is particularly suitable as a hair cosmetic composition. In such embodiments, the hybrid copolymer can be used as an alternative to conventional styling polymers, such as those made of PVP K30 and PVP/VA. Accordingly, in an embodiment of the invention, the hair cosmetic compositions may comprise a hybrid copolymer comprising at least one nonionic ethylenically unsaturated monomer and a naturally derived hydroxyl containing chain transfer agent as an end group; and a hybrid synthetic copolymer comprising one or more synthetic polymers derived from the at least one nonionic ethylenically unsaturated monomer with at least one initiator fragment as an end group. The hair cosmetic composition further comprises an effective amount of a suitable hair cosmetic additive, such as may be selected from aesthetic enhancers, conditioning agents, adjuvants, preservatives, thickeners or gelling agents, fixatives and property modifiers as hereinbefore described. In an embodiment of the invention, the hair cosmetic additive is a gelling agent. Preferably, the gelling agent includes an acrylic-based carbomer thickener, such as the Carbopol® series of thickeners.

In another embodiment, the hair cosmetic composition is made in the presence of a hybrid initiator, such as a nonionic initiator. Exemplary hybrid initiators include, but are not limited to, peroxides, azo initiators as well as redox systems like tert-butyl hydroperoxide and erythorbic acid, peroxide such as persulfate and an amine such as hydroxylamine sulfate, persulfate and sodium formaldehyde sulfoxylate etc. In an embodiment of the invention, the initiatior is an Azo initiators, such as 2,2'-Azobis[2-methyl-N-(2-hydroxyethyl)propionamide]. It has been found that embodiments according to the present invention afford performance characteristics comparable to conventional hair styling aids, but using less synthetic monomer. Optional conventional additives may also be incorporated into the hair cosmetic compositions of this invention to provide certain modifying properties to the composition. Included among these additives are silicones and silicone derivatives; humectants; moisturizers; plasticizers, such as glycerine, glycol and phthalate esters and ethers; emollients, lubricants and penetrants, such as lanolin compounds; fragrances and perfumes; UV absorbers; dyes, pigments and other colorants; anticorrosion agents; antioxidants; detackifying agents; combing aids and conditioning agents; antistatic agents; neutralizers; glossifiers; preservatives; proteins, protein derivatives and amino acids; vitamins; emulsifiers; surfactants; viscosity modifiers, thickeners and rheology modifiers; gelling agents; opacifiers; stabilizers; sequestering agents; chelating agents; pearling agents; aesthetic enhancers; fatty acids, fatty alcohols and triglycerides; botanical extracts; film formers; and clarifying agents. These additives are present in small, effective amounts to accomplish their function, and generally will comprise from about 0.01 to about 10% by weight each, and from about 0.01 to about 20% by weight total, based on the weight of the composition.

The hair cosmetic composition may optionally be a gel or a mousse. For mousses, the solvent may be water or a lower ($C_{1-4}$ alcohol, particularly methanol, ethanol, propanol, isopropanol, or butanol, although any solvent known in the art may be used. In an embodiment of the invention, the hair cosmetic composition is a gel fixative.

In an embodiment of the invention, the hair cosmetic composition has a turbidity of less than 40 NTU, in another embodiment less than 30 NTU and in an even further embodiment less than 20 NTU.

In an embodiment of the invention, the viscosity range of the hair cosmetic composition is from about 10,000 cps to about 70,000 cps and in another embodiment the viscosity is in the range of from about 30,000 cps to about 65,000 cps and in an even further embodiment the viscosity is in the range of from about 40,000 cps to about 55,000 cps.

In an embodiment of the invention, the high humidity curl retention (HHCR) of the hair cosmetic composition is greater than about 10% at 5 hours, in another embodiment the HHCR is greater than 20% at 5 hours and in an even further embodiment the HHCR is greater than 30% at 5 hours.

Optionally, an embodiment of the invention may also comprise a spray. For sprays propellants include any optional propellant(s). Such propellants include, without limitation, ethers, such as dimethyl ether; one or more lower boiling hydrocarbons such as $C_3$-$C_6$ straight and branched chain hydrocarbons, for example, propane, butane, and isobutane; halogenated hydrocarbons, such as, hydrofluorocarbons, for example, 1,1-difluoroethane and 1,1,1,2-tetrafluoroethane, present as a liquefied gas; and the compressed gases, for example, nitrogen, air and carbon dioxide.

In embodiments of the invention, the hybrid copolymer compositions encompassing both anionic and non-anionic hybrid copolymer compositions are latently-detectable, which means that they will not be detectable in the visible light range until the hybrid copolymer composition is contacted with a photoactivator. As defined herein, the "photoactivator" is an appropriate reagent or reagents which, when present in effective amounts, will react with the hybrid copolymer composition, thereby converting the hybrid copolymer composition into a chemical species which strongly absorbs in the region from about 300 to about 800 nanometers when activated with, for example, sulfuric acid and phenol. In an embodiment of this invention, the activated hybrid copolymer composition will absorb in the region from about 400 to about 700 nanometers.

A latently detectable moiety of this invention will be formed from a naturally derived hydroxyl containing chain transfer agent especially when it is saccharide or polysaccharide moiety. The photoactivator may be the combination of sulfuric acid and phenol (see Dubois et al, Anal. Chem. 28 (1956) p. 350 and Example 1 of U.S. Pat. No. 5,654,198, which is incorporated in its entirety by reference herein). Polymers typically tagged with latently detectable moieties exhibit a drop in efficacy when compared to polymers without these groups. This is especially true when the weight percent of the latently detectable moiety is over 10 or 20 percent of the polymer. However, it has been found that the hybrid copolymers compositions of the present invention perform well even when containing 50 percent or more of the latently detectable moiety. Thus, the advantages of good performance and ready detectability are provided, which allow monitoring the system and controlling scale without over dosing the scale control polymer.

In further embodiments of the present invention the ethylenically unsaturated monomer of the ester hybrid copolymer composition may optionally be derived from at least one ester monomer. Exemplary ester monomers include, but are not limited to, esters derived from dicarboxylic acid as well as hydroxyalkyl esters. Suitable ester monomers derived from dicarboxylic acid include, but are not limited to, monomethylmaleate, dimethylmaleate, monomethylitaconate, dimethylitaconate, monoethylmaleate, diethylmaleate, monoethylitaconate, diethylitaconate, monobutylmaleate, dibutylmaleate, monobutylitaconate and dibutylitaconate. Suitable hydroxyalkyl esters include, but are not limited to, hydroxy ethyl (meth)acrylate, hydroxy propyl (meth)acrylate, hydroxy butyl (meth)acrylate and the like.

In yet another aspect, the invention relates to a method of preparing a hybrid copolymer composition. The method of preparing the hybrid copolymer composition comprises reacting at least one monomer with a solution of a naturally derived hydroxyl containing chain transfer agent that includes only minor amounts of secondary chain transfer agents, such as sodium hypophosphite. In an embodiment of the invention, the secondary chain transfer agent may be less than 20 weight percent of the hybrid polymer. In another embodiment, solution of the naturally derived hydroxyl containing chain transfer agent may be substantially free of secondary transfer agents. The method may further comprise catalyzing the polymerizing step with an initiator that is substantially free of a metal ion initiating system at a temperature sufficient to activate said initiator.

In still yet another aspect, the invention relates to an "amphoteric hybrid copolymer compositions" containing both anionic and cationic groups. The anionic moieties can be on the natural component with the cationic moieties on the synthetic component or the cationic moieties can be on the natural component with the anionic moieties on the synthetic component or combinations thereof. When the natural component is a polysaccharide, the anionic material can be an oxidized starch and the cationic moiety can be derived from cationic ethylenically unsaturated monomers such as diallyldimethylammonium chloride. Alternatively, the oxidized starch itself may first be reacted with cationic substituent such as 3-chloro-2-hydroxypropyl) trimethylammonium chloride and then reacted with a synthetic anionic or cationic monomer or mixtures thereof. In another embodiment, a cationic starch may be reacted with an anionic monomer. Finally, the cationic and anionic moieties may be on the synthetic component of these polymers. These amphoteric hybrid copolymer composition containing both anionic and cationic groups are particularly useful in detergent formulations as dispersants and cleaning aids. It is understood that these polymers will contain both a natural component and a synthetic component. The cationic moieties are preferably present in the range of 0.001 to 40 mole % of the anionic moieties, more preferably the cationic moieties are present in the range of 0.01 to 20 mole % of the anionic moieties, and most preferably the cationic moieties are present in the range of 0.1 to 10 mole % of the anionic moieties. Polymers formed from a cationic ethylenically unsaturated monomer tend to have poor toxicological and environmental profiles. Therefore, it is necessary to minimize the level of cationic ethylenically unsaturated monomer in the amphoteric hybrid copolymer composition. In an embodiment of the invention, when a cationic ethylenically unsaturated monomer is used to produce the amphoteric graft copolymer composition, the cationic ethylenically unsaturated monomer is preferably present up to 10 mole % of the anionic ethylenically unsaturated monomer, more preferably the cationic ethylenically unsaturated monomer is preferably present up to 6 mole % of the anionic ethylenically unsaturated monomer, and most preferably the cationic ethylenically unsaturated monomer is preferably present up to 5 mole % of the anionic ethylenically unsaturated monomer.

In still yet another aspect, the invention relates to anionic hybrid copolymer compositions derived from monomers produced from natural sources such as acrylamide produced by fermentation. One skilled in the art will recognize that monomers produced from natural sources increase the renewable carbon content of the polymers of this invention.

EXAMPLES

The following examples are intended to exemplify the present invention but are not intended to limit the scope of the invention in any way. The breadth and scope of the invention are to be limited solely by the claims appended hereto.

Synthesis Example 1

Preparation of an N-Vinyl Pyrrolidone/Maltodextrin (DE 9.0-12.0) Hybrid Copolymer by Synthesis Method A This is an example of a successful synthesis. The synthetic component of the hybrid copolymer composition is derived from N-vinyl pyrrolidone; the naturally occurring portion of the hybrid copolymer composition is derived from a DE 9.0-12.0 maltodextrin, which is the naturally derived hydroxyl containing chain transfer agent. A DE of 9.0-12.0 roughly corresponds to a glucose degree of polymerization of 10-13, or a number average molecular weight (Mn) of 1600-2100. The amount of the hybrid copolymer composition derived from maltodextrin was 50 wt. % (based on dry polymer). A critical feature of this synthesis is that a maltodextrin with a DE>5 was used.

Reagents:
Initial Charge:

| | |
|---|---|
| Deionized water | 23.5671 g |
| Maltrin M100 | 26.4966 g, |
| (Grain Processing Corporation; | as is basis; |
| Lot# M0910530; 94.41% solids) | 25.0154 g, |
| | 100% basis |
| N-vinyl pyrrolidone (Aldrich) | 6.2436 g |
| 2,2'-Azobis[2-methyl-N-(2-hydroxyethyl)propionamide] | 0.0654 g |
| (Wako VA-086) | |

Addition Funnel #1:

| | |
|---|---|
| 2,2'-Azobis[2-methyl-N-(2-hydroxyethyl)propionamide] | 0.1908 g |
| (Wako VA-086) | |
| Deionized water | 55.2253 g |

Addition Funnel #2:

| | |
|---|---|
| N-vinyl pyrrolidone (Aldrich) | 18.7925 g |
| Deionized water | 36.9796 g |

A four-neck round bottom flask was equipped with a mechanical stirrer, reflux condenser, a 60 mL addition funnel and a 125 mL addition funnel. The weight of the flask with stirring apparatus alone was 483.20 g. To the flask were charged 23.5671 g deionized water and 26.4966 g Maltrin M100 maltodextrin. The mixture was stirred until a homogeneous solution was obtained.

To the 60 mL addition funnel was charged a solution of VA-086 initiator in deionized water (Additional Funnel #1); to the 125 mL addition funnel was charged a solution of N-vinyl pyrrolidone in deionized water [Addition Funnel #2].

The reaction was warmed to 95° C. using a thermostatted oil bath. When the temperature reached about 53° C., 6.2436 g N-vinyl pyrrolidone and 0.0654 g VA-086 were added in one portion and heating was continued. A transient light pink color was noted after the addition; the mixture remained clear. When temperature reached 93° C., drop-wise addition over 2.45 h of the contents of the two addition funnels was commenced. The rate of addition was fairly uniform although adjustments to the rate were occasionally necessary to keep the addition rates even. After the addition was complete, heating at 95° C. was continued for an additional 2.75 h. At the conclusion of the reaction, the polymer solution was clear.

After cooling and standing overnight, the polymer solution was turbid and phase separation appeared to have occurred. The polymer was diluted in the reaction vessel with a total of 83.3 g deionized water. A clear, apparently single phase solution was obtained. The yield of polymer solution measured in the flask was 246.08 g.

Theoretical solids of the polymer solution (based on the amount of monomer and maltodextrin added divided by the total yield of polymer solution): 20.3%. The experimental solids (gravimetric at 130° C. for 1.5 h, duplicate runs) was 19.9%. This corresponds to a monomer conversion of 96%.

Synthesis Example 2

Preparation of an N-Vinyl Pyrrolidone/Maltodextrin (DE 9.0-12.0) Hybrid Copolymer by Synthesis Method B This is an example of a successful synthesis. The synthetic component of the hybrid copolymer composition is derived from N-vinyl pyrrolidone; the naturally occurring portion of the hybrid copolymer composition is derived from a DE 9.0-12.0 maltodextrin, which is the naturally derived hydroxyl containing chain transfer agent. A DE of 9.0-12.0 roughly corresponds to a glucose degree of polymerization of 10-13, or a number average molecular weight (Mn) of 1600-2100. The amount of the hybrid copolymer composition derived from maltodextrin was 50 wt. % (based on dry polymer). A critical feature of this synthesis is that a maltodextrin with a DE>5 was used.

Reagents:
Initial Charge:

| | |
|---|---|
| Deionized water | 14.49 g |
| N-vinyl pyrrolidone (Aldrich) | 6.29 g |
| 2,2'-Azobis[2-methyl-N-(2-hydroxyethyl)propionamide] | 0.0624 g |
| (Wako VA-086) | |

Addition Funnel #1:

| | |
|---|---|
| Maltrin M100 (Grain Processing Corporation; | 26.4923 g, |
| Lot# M0910530; 94.41% solids) | as is basis; |
| | 25.0114 g, |
| | 100% basis |
| 2,2'-Azobis[2-methyl-N-(2-hydroxyethyl)propionamide] | 0.1888 g |
| (Wako VA-086) | |
| Deionized water | 46.51 g |

Addition Funnel #2:

| | |
|---|---|
| N-vinyl pyrrolidone (Aldrich) | 18.7547 g |
| Deionized water | 54.5410 g |

A four-neck round bottom flask was equipped with a mechanical stirrer, reflux condenser, and two 125 mL addition funnels. The weight of the flask with stirring apparatus alone was 479.19 g. To the flask were charged 14.49 g deionized water, 6.29 g N-vinyl pyrrolidone, and 0.0624 g Wako VA-086. The mixture was stirred until a homogeneous solution was obtained.

To the first 125 mL addition funnel was charged a solution of 0.1888 g VA-086 initiator and 26.4923 g Maltrin M100 in 46.51 g deionized water [Additional Funnel #1]; to the second 125 mL addition funnel was charged a solution of N-vinyl pyrrolidone in deionized water [Addition Funnel #2].

The reaction was warmed to 95° C. using a thermostatted oil bath. When temperature reached 93° C., drop-wise addition over 3 h of the contents of the two addition funnels was commenced. The rate of addition was fairly uniform although adjustments to the rate were occasionally necessary to keep the addition rates even. After the addition was complete, heating at 95° C. was continued for an additional 3 h. At the conclusion of the reaction, the polymer solution was clear.

After cooling and standing overnight, the polymer solution was turbid and phase separation appeared to have occurred. The polymer was diluted in the reaction vessel with a total of 83.3 g deionized water. A clear, apparently single phase solution was obtained. The yield of polymer solution measured in the flask was 249.24 g.

Theoretical solids of the polymer solution (based on the amount of monomer and maltodextrin added divided by the total yield of polymer solution): 20.1%. The experimental solids (gravimetric at 130° C. for 1.5 h) was 20.1%. This corresponds to a monomer conversion of essentially 100%.

Synthesis Examples 3-8

Preparation of Additional Non-Ionic Hybrid Copolymers

Additional hybrid copolymer compositions were prepared by Synthesis Methods A or B. The compositions are summarized in Table 1 below.

TABLE 1

Additional hybrid copolymer compositions.

| Synthesis Example | Synthesis Method | Maltodextrin used | Synthetic component | Amount of maltodextrin in final polymer (wt. % of dry polymer) | Polymer concentration in water |
|---|---|---|---|---|---|
| 3 | B | Maltrin M100 (DE 9.0-12.0) | N-vinyl pyrrolidone | 35 wt. % | 28.9 wt. % |
| 4 | B | Maltrin M100 (DE 9.0-12.0) | N-vinyl pyrrolidone | 65 wt. % | 29.7 wt. % |
| 5 | A | Maltrin M100 (DE 9.0-12.0) | N-vinyl pyrrolidone (50 wt. %) and vinyl caprolactam (50 wt. %) | 50 wt. % | 36.3 wt. % |
| 6 | B | Maltrin M150 (DE 13.0-17.0) | N-vinyl pyrrolidone | 50 wt. % | 25.1 wt. % |
| 7 | A | Maltrin M100 (9.0-12.0) | N-vinyl pyrrolidone | 90 wt. % | 29.9 wt. % |
| 8 | A | Maltrin M150 (DE 13.0-17.0)) | N-vinyl pyrrolidone (75 wt. %), methacrylamide (20 wt. %); and vinyl imidazole (5 wt. %) | 50 wt. % | 28.7 wt. % |

All of the resulting polymers were clear in solution at the listed concentration in water. The polymer solutions were preserved by the addition of 0.5-0.75 wt. % Glydant Plus.

Synthesis Example 9

Preparation of an N-Vinyl Pyrrolidone/Maltodextrin (DE 9.0-12.0) Hybrid Copolymer by Synthesis Method C This is an example of a successful synthesis. The synthetic component of the hybrid copolymer composition is derived from N-vinyl pyrrolidone; the naturally occurring portion of the hybrid copolymer composition is derived from a DE 9.0-12.0 maltodextrin, which is the naturally derived hydroxyl containing chain transfer agent. A DE of 9.0-12.0 roughly corresponds to a glucose degree of polymerization of 10-13, or a number average molecular weight (Mn) of 1600-2100. The amount of the hybrid copolymer composition derived from maltodextrin was 50 wt. % (based on dry polymer). A critical feature of this synthesis is that a maltodextrin with a DE>5 was used.

Reagents:
Initial Charge:

| | |
|---|---|
| Deionized water | 288.75 g |
| Maltrin M100 (DE 9.0-12.0; Grain Processing Corporation; 94.05% solids) | 66.45 g, as is basis; 62.50 g, 100% basis |
| N-vinyl pyrrolidone (Aldrich) | 62.5 g |
| 2,2'-Azobisisobutyronitrile (Vazo 64; DuPont) | 0.63 g |

1 L four-neck round bottom reaction flask was equipped with a 2¾" S-S mechanical stirrer/overhead mixer motor, thermometer and nitrogen inlet topped reflux condenser. To the flask was charged 62.5 g N-vinyl pyrrolidone and 0.63 g Vazo-64 initiator. The resulting solution was purged with nitrogen at ambient temperature for about 15 minutes.

To a 600 mL beaker, was add 288.75 g water and 66.45 g Maltrin M100 (Maltodextrin DE=9 to 12; 94.05% solids). The resulting mixture was stirred until the maltodextrin dissolved, and then the clear maltodextrin solution was transferred to a 500 mL addition funnel. The addition funnel was set up on reactor, and a sub-surface nitrogen purge was applied to the solution in the addition funnel at ambient temperature for about 15 minutes.

The maltodextrin solution was added rapidly to the reaction flask monomer/initiator in reactor. Heating of the reaction mixture was then begun using a water bath (hot-plate controlled by Thermo-watch controlled via bath thermometer). The reaction temperature was brought to 70±1° C.° under a positive pressure of nitrogen. A≈3° C. exotherm was noted during the initial ¾ Hr of reaction, after which the reaction and bath temperatures became almost equal.

The reaction was held at 70° C. for a total of 10 h (over two days). At the conclusion of the polymerization, the reaction was cooled to ambient temperature with a cold water bath, the amount of water that was found to be lost (2.18 g) was replenished.

The polymer solution as prepared was not transparent. The polymer solution was diluted from 30.3% solids (in theory) to 20% solids (in theory by the addition of water, but the solution was still not clear. Further dilution to a theoretical polymer concentration of 18 wt. % resulted in an essentially transparent solution. A total of 279.58 g extra water was needed to dilute the polymer.

The yield of polymer solution was 697.9 g. The experimental solids was 17.9%. This corresponds to a monomer conversion of 99.4. The final product was preserved by the addition of 0.75 wt % Glydant Plus on total solution weight; final polymer solution solids were 18.47%.

Synthesis Example 10

Synthesis of Non-Ionic Hybrid Copolymer Composition with Polysaccharide Chain Transfer Agent 50 grams of maltodextrin as a polysaccharide chain transfer agent (STAR-DRI 180 DE 18 spray-dried maltodextrin available from Tate and Lyle, Decatur, Ill.) was dissolved in 150 grams of water in a reactor and heated to 75° C. A monomer solution containing 50 grams of hydroxyethylacrylate was subsequently added to the reactor over a period of 50 minutes. An initiator solution comprising of 2 grams of V-50 [2,2'-Azobis (2 amidino-propane) dihydrochloride azo initiator from Wako Pure Chemical Industries, Ltd., Richmond, Va.] in 30 grams of water was added to the reactor at the same time as the monomer solution over a period of 60 minutes. The reaction product was held at 75° C. for an additional 60 minutes. The final product was a clear almost water white solution.

Synthesis Example 11

Synthesis of Non-Anionic Hybrid Copolymer Composition 150 grams of maltodextrin as a polysaccharide chain transfer agent (Cargill MD™ 01918 dextrin, spray-dried maltodextrin obtained by enzymatic conversion of common corn starch, available from Cargill Inc., Cedar Rapids, Iowa) was initially dissolved in 200 grams of water in a reactor and 70 g of HCl (37%) was added and heated to 98° C. A monomer solution containing 109 grams of dimethyl aminoethyl methacrylate dissolved in 160 grams of water was subsequently added to the reactor over a period of 90 minutes. An initiator solution comprising of 6.6 grams of sodium persulfate in 40 grams of water was added to the reactor at the same time as the monomer solution over a period of 90 minutes. The reaction product was held at 98° C. for an additional 60 minutes. The reaction product was then neutralized by adding 14 grams of a 50% solution of NaOH and the final product was an amber colored solution.

Synthesis Example 12

Synthesis of Non-Anionic Hybrid Copolymer Composition 35 grams of Amioca Starch was dispersed in 88 grams of water in a reactor and heated to 52. The starch was depolymerized by addition of 1.07 grams of concentrated sulfuric acid (98%). The suspension was held at 52° C. for 1.5 hours. The reaction was then neutralized with 1.84 grams of 50% NaOH solution and the temperature was raised to 90° C. for 15 minutes. The starch gelatinizes and the viscosity increased during the process and a gel is formed. The viscosity dropped after the gelatinization was completed. The temperature was lowered to 72 to 75° C. A solution of 80.7 grams of dimethyl diallyl ammonium chloride (62% in water) was added to the reactor over a period of 30 minutes. An initiator solution comprising of 0.2 grams of sodium persulfate in 20 grams of water was added to the reactor at the same time as the monomer solution over a period of 35 minutes. The reaction product was held at 98° C. for an additional 2 hours. The final product was a slightly opaque yellow colored solution.

Synthesis Example 13

Synthesis of Non-Anionic Hybrid Copolymer Composition 35 grams of Amioca Starch was dispersed in 88 grams of water in a reactor and heated to 52. The starch was depolymerized by addition of 0.52 grams of concentrated sulfuric acid (98%). This is half the acid used in Example 32 and causes less depolymerization of the starch resulting in a higher molecular weight. Thus the molecular weight of the polysaccharide chain transfer agent can be controlled. The suspension was held at 52° C. for 1.5 hours. The reaction was then neutralized with 0.92 grams of 50% NaOH solution and the temperature was raised to 90° C. for 15 minutes. The starch gelatinizes and the viscosity increased during the process and a gel was formed. The viscosity dropped after the gelatinization was completed. The reaction was diluted with 30 grams of water and the temperature was lowered to 72 to 75° C. A solution of 80.7 grams of dimethyl diallyl ammonium chloride (62% in water) was added to the reactor over a period of 30 minutes. An initiator solution comprising of 0.2 grams of sodium persulfate in 20 grams of water was added to the reactor at the same time as the monomer solution over a period of 35 minutes. The reaction product was held at 98° C. for an additional 2 hours. The final product was a clear light yellow colored solution.

Synthesis Example 14

Synthesis of Non-Ionic Hybrid Copolymer Composition with Polysaccharide (Inulin) Chain Transfer Agent 50 grams of a polysaccharide chain transfer agent (DEQUEST® PB11620 carboxymethyl inulin 20% solution available from Thermphos) was dissolved in 150 grams of water in a reactor and heated to 75° C. A monomer solution containing 50 grams of N,N dimethyl acrylamide was subsequently added to the reactor over a period of 50 minutes. An initiator solution comprising of 2 grams of V-50 [2,2'-azobis (2-amidinopropane) dihydrochloride] azo initiator from Wako Pure Chemical Industries, Ltd., Richmond, Va.] in 30 grams of water was added to the reactor at the same time as the monomer solution over a period of 60 minutes. The reaction product was held at 75° C. for an additional 60 minutes. The reaction product was diluted with 140 grams of water and the final product was a clear homogenous amber colored solution.

Synthesis Example 15

Synthesis of Non-Anionic Hybrid Copolymer Composition with Polysaccharide (Cellulosic) Chain Transfer Agent Carboxymethyl cellulose (AQUALON® CMC 9M3ICT available from Hercules, Inc., Wilmington, Del.) was depolymerized in the following manner. Thirty grams of AQUA-LON® CMC was introduced in to 270 g of deionized water with stirring. 0.03 g of Ferrous ammonium sulfate hexahydrate and 2 g of hydrogen peroxide ($H_2O_2$) solution (35% active) was added. The mixture was heated to 60° C. and held at that temperature for 30 minutes. This depolymerized CMC solution was then heated to 90° C.

A monomer solution containing 50 grams of acrylamide (50% solution) is subsequently added to the reactor over a period of 50 minutes. An initiator solution comprising of 2 grams of V-086 2,2'-Azobis[2-methyl-N-(2-hydroxyethyl) propionamide] azo initiator from Wako Pure Chemical Industries, Ltd., Richmond, Va.] in 30 grams of water is added to the reactor at the same time as the monomer solution over a period of 60 minutes. The reaction product is held at 90° C. for an additional 60 minutes.

Synthesis Example 16

Synthesis of a Non-Anionic Hybrid Copolymer Composition Containing a Quaternary Amine Monomer and a Cationic Polysaccharide Functionality 40 grams of Nsight C-1 as a cationic starch chain transfer agent (available from AkzoNobel, Bridgewater N.J.) was initially dissolved in 100 grams of water in a reactor and heated to 98° C. A solution of 38.7 grams of dimethyl diallyl ammonium chloride (62% in water) was subsequently added to the reactor over a period of 45 minutes. An initiator solution comprising of 3.3 grams of sodium persulfate in 20 grams of water was added to the reactor at the same time as the monomer solution over a period of 45 minutes. The reaction product was held at 98° C. for an additional 60 minutes. The final product was a clear amber colored solution.

Synthesis Example 17

Synthesis of Non-Anionic Hybrid Copolymer Composition 35 grams of Hylon VII Starch (a high amylose starch containing 70% amylose) was dispersed in 132 grams of water in a reactor and heated to 52° C. The starch was depolymerized by addition of 1.07 grams of concentrated sulfuric acid (98%). The suspension was held at 52° C. for 1.5 hours. The reaction was then neutralized with 1.84 grams of 50% NaOH solution and the temperature was raised to 90° C. for 15 minutes. The starch gelatinizes and the viscosity increased during the process and a gel was formed. The viscosity dropped after the gelatinization was completed. The reaction was diluted with 30 grams of water and the temperature was lowered to 72 to 75° C. A solution of 100.1 grams of [3-(methacryloylamino)propyl]-trimethylammonium chloride (50% in water) was added to the reactor over a period of 30 minutes. An initiator solution comprising of 0.2 grams of sodium persulfate in 20 grams of water was added to the reactor at the same time as the monomer solution over a period of 35 minutes. The reaction product was held at 98° C. for an additional 2 hours. The final product was an opaque white homogenous solution.

Synthesis Example 18

Synthesis of Non-Anionic Hybrid Copolymer Composition 35 grams of Amioca Starch was dispersed in 88 grams of water in a reactor and heated to 52. The starch was depolymerized by addition of 0.52 grams of concentrated sulfuric acid (98%). This is half the acid used in Example 41 and causes less depolymerization of the starch resulting in a higher molecular weight. Thus the molecular weight of the polysaccharide chain transfer agent can be controlled. The suspension was held at 52° C. for 1.5 hours. The reaction was then neutralized with 0.92 grams of 50% NaOH solution and the temperature was raised to 90° C. for 15 minutes. The starch gelatinizes and the viscosity increased during the process and a gel was formed. The viscosity dropped after the gelatinization was completed. The reaction was diluted with 30 grams of water and the temperature was lowered to 72 to 75° C. A solution of 66.71 g [2-(methacryloxy)ethyl]-trimethylammonium chloride (75% in water) was added to the reactor over a period of 30 minutes. An initiator solution comprising of 0.2 grams of sodium persulfate in 20 grams of water was added to the reactor at the same time as the monomer solution over a period of 35 minutes. The reaction product was held at 98° C. for an additional 2 hours. The final product was a homogeneous opaque white paste.

Synthesis Example 19

Synthesis of Non-Ionic Hybrid Copolymer Composition with Polysaccharide Chain Transfer Agent Hydroxyethyl cellulose (QP 300 available from Dow) was depolymerized in the following manner. Thirty grams of QP 300 was introduced in to 270 g of deionized water with stirring. 0.05 g of Ferrous ammonium sulfate hexahydrate and 1 g of hydrogen peroxide ($H_2O_2$) solution (35% active) was added. The mixture was heated to 60° C. and held at that temperature for 30 minutes. This depolymerized CMC solution was then heated to 90° C.

A solution of 38.7 grams of dimethyl diallyl ammonium chloride (62% in water) is subsequently added to the reactor over a period of 50 minutes. An initiator solution comprising of 2 grams of V-086 2,2'-Azobis[2-methyl-N-(2-hydroxyethyl)propionamide] azo initiator from Wako Pure Chemical Industries, Ltd., Richmond, Va.] in 30 grams of water is added to the reactor at the same time as the monomer solution over a period of 60 minutes. The reaction product is held at 90° C. for an additional 60 minutes.

Synthesis Example 20

Synthesis of Catanionic Hybrid Copolymer Composition Containing Both Anionic and Cationic Groups 150 grams of water was added to 765 grams of RediBond 5330A (available from National Starch and Chemical) (27% aqueous solution), and the solution was heated to 40° C. The pH of the solution was adjusted to pH 7.0 with 50% sodium hydroxide solution. 0.13 grams of alpha-amylase was added to the solution, which was allowed to cook for 1 hour. 254.7 grams of this pre-digested RediBond 5330A as a cationic polysaccharide chain transfer agent, 2.32 grams of 50% sodium hydroxide solution, and 20.16 grams of monomethyl maleate was heated in a reactor to 87° C. A monomer solution containing 73.88 grams of acrylic acid and 17.96 grams of water was subsequently added to the reactor over a period of 4.5 hours. An initiator solution comprised of 13.84 grams of erythorbic acid dissolved in 100 grams of water, and a second initiator solution comprised of 13.98 grams of tert-butyl hydrogen peroxide were added to the reactor at the same time as the monomer solution over a period of 5 hours. The reaction product was cooled and held at 65° C. for an additional 60 minutes. The final product was a brown solution.

Synthesis Example 21

Synthesis of an Ester Hybrid Copolymer Composition 45.9 grams of monomethylmaleate (ester monomer) was dissolved in 388 grams of water. 15.3 grams of ammonium hydroxide was added and the mixture was heated to 87 C. 85 grams of maltodextrin of DE 18 (Cargill MD™ 01918, spray-dried maltodextrin obtained by enzymatic conversion of common corn starch, available from Cargill Inc., Cedar Rapids, Iowa) was added just before the monomer and initiator feeds were started. A monomer solution containing a mixture of 168 grams of acrylic acid and 41.0 grams of hydroxyethyl methacrylate (ester monomer) was added to the reactor over a period of 5 hours. A first initiator solution comprising of 21 grams of erythorbic acid dissolved in 99 grams of water was added over a period of 5.5 hours. A second initiator solution comprising of 21 grams of a 70% solution of tertiary butyl hydroperoxide dissolved in 109 grams of water was added over a period of 5.5 hours. The reaction product was held at 87° C. for 30 minutes. The final product was a clear light amber solution and had 34.1% solids.

Comparative Synthesis Example 1

Attempted Preparation of an N-Vinyl Pyrrolidone/Maltodextrin (DE 4.0-7.0) Hybrid Copolymer The synthetic component of the hybrid copolymer composition is derived from N-vinyl pyrrolidone; the naturally occurring portion of the hybrid copolymer composition is derived from a DE 4.0-7.0 maltodextrin, which is the naturally derived hydroxyl containing chain transfer agent. A DE of 4.0-7.0 roughly corresponds to a glucose degree of polymerization of 17 to 30, or a number average molecular weight (Mn) of 2800 to 4900. The amount of the hybrid copolymer composition derived from maltodextrin was 50 wt. % (based on dry polymer). A critical feature of this synthesis is that a maltodextrin with a DE of about 5 was used.
Reagents:
Initial Charge:

| Deionized water | 57.12 g |
|---|---|
| Maltrin M040, | 26.3804 g, |
| (DE 4.0-7.0 maltodextrin; Grain Processing Corporation; 94.77% solids) | as is basis; 25.0007 g, 100% basis |
| N-vinyl pyrrolidone (Aldrich) | 6.3053 g |
| 2,2'-Azobis[2-methyl-N-(2-hydroxyethyl)propionamide] (Wako VA-086) | 0.0645 g |

Addition Funnel #1:

| 2,2'-Azobis[2-methyl-N-(2-hydroxyethyl)propionamide] (Wako VA-086) | 0.1934 g |
|---|---|
| Deionized water | 38.9322 g |

Addition Funnel #2:

| N-vinyl pyrrolidone (Aldrich) | 18.7595 g |
|---|---|
| Deionized water | 19.8633 g |

A four-neck round bottom flask was equipped with a mechanical stirrer, reflux condenser, a 60 mL addition funnel and a 125 mL addition funnel. The weight of the flask with stirring apparatus alone was 467.74 g. To the flask were charged 57.12 g of deionized water and 26.3804 g Maltrin M040. The resulting mixture was heated using a thermostatted oil bath to ~90° C. at which point the maltodextrin slowly dissolved to give a clear, slightly viscous solution.

To the 60 mL addition funnel was charged a solution of 0.1934 g VA-086 initiator in 38.9322 g deionized water [Additional Funnel #1]; to the 125 mL addition funnel was charged a solution of 18.7595 g N-vinyl pyrrolidone in 19.8633 g deionized water [Addition Funnel #2].

At this point, 6.3053 g N-vinyl pyrrolidone and 0.0645 g Wako VA-086 plus a few mL of deionized water rinses were charged to the reaction mixture and heating was continued. When the reaction temperature reached 93° C., drop-wise addition over 2.5 h of the contents of the two addition funnels was commenced. The rate of addition was fairly uniform although adjustments to the rate were occasionally necessary to keep the addition rates even. The reaction was kept at 95±2° C. for the duration of the addition. Some turbidity was noted towards the end of the monomer/initiator addition. After the addition was complete, heating at 95° C. was continued for an additional 3.25 h. At the conclusion of the reaction, the polymer solution was turbid at 95° C.

Significant phase separation was noted after the polymerization reaction had been allowed to stand overnight; the reaction mixture was white and cloudy. The reaction mixture was heated to about 90° C. for about 20 minutes; at about 76° C., the mixture became translucent. The reaction was diluted with 83.52 g water at elevated temperature and then allowed to cool down. A clear solution was never obtained. Yield of polymer solution measured in the flask: 250.01 g.

Dilution of a small amount of the homogenized mixture to 10% solids failed to give a clear solution.

Theoretical solids of the polymer solution (based on the amount of monomer and maltodextrin added divided by the total yield of polymer solution): 20.0%. The experimental solids (gravimetric at 130° C. for 1.5 h) was 20.0%. This corresponds to a monomer conversion of essentially 100%.

On standing for several days, massive phase separation was noted.

Comparative Synthesis Example 2

Attempted Preparation of an N-Vinyl Pyrrolidone/Maltodextrin (DE 4.0-7.0) Hybrid Copolymer The synthetic component of the hybrid copolymer composition is derived from N-vinyl pyrrolidone; the naturally occurring portion of the hybrid copolymer composition is derived from a DE 4.0-7.0 maltodextrin, which is the naturally derived hydroxyl containing chain transfer agent. A DE of 44.0-7.0 roughly corresponds to a glucose degree of polymerization of 17 to 30, or a number average molecular weight (Mn) of 2800 to 4900. The amount of the hybrid copolymer composition derived from maltodextrin was 25 wt. % (based on dry polymer). A critical feature of this synthesis is that a maltodextrin with a DE of about 5 was used.

Reagents:
Initial Charge:

| | |
|---|---|
| Deionized water | 28.84 g |
| Maltrin M040 | 13.1807 g, |
| (DE 4.0-7.0 maltodextrin; | as is basis; |
| Grain Processing Corporation; | 12.4913 g, |
| 94.77% solids) | 100% basis |

125 mL Addition Funnel:

| | |
|---|---|
| N-vinyl pyrrolidone (Aldrich) | 37.5242 g |
| 2,2'-Azobis[2-methyl-N-(2-hydroxyethyl)propionamide] (Wako VA-086) | 0.3838 g |
| Deionized water | 58.2860 g |

A four-neck round bottom flask was equipped with a mechanical stirrer, reflux condenser, a 125 mL addition funnel, and a stopper. The weight of the flask with stirring apparatus alone was 471.62 g. To the flask were charged 13.1807 g Maltrin M040 (DE 5 maltodextrin) and 28.84 g deionized water. The mixture was heated to ~90° C. with stirring until a clear, homogeneous solution was obtained. The mixture was allowed to cool somewhat after it became clear, but it did not drop below 50° C.

To the 125 mL addition funnel was charged a solution of VA-086 initiator and N-vinyl pyrrolidone in deionized water. The volume in the addition funnel was 98 mL. To the reaction mixture was rapidly added 24.5 mL (¼ of the total volume) of the contents of the addition funnel.

The resulting mixture was stirred and warmed to 95° C. using a thermostatted oil bath. When the temperature reached 93° C., drop-wise addition over 3 h of the contents of the addition funnels was commenced. The rate of addition was fairly uniform throughout. During the course of the addition viscosity was noted to increase, and the reaction mixture gradually changed from clear to hazy. After the addition was complete, heating at 95° C. was continued for an additional 3 h. One hour after the addition was complete, 29.17 mL deionized water was added drop-wise to the reaction via the addition funnel while the reaction temperature was maintained at 95° C. The polymerization reaction mixture remained hazy after the addition of the water. After heating was stopped, the reaction became quite turbid.

After cooling and standing overnight, the polymer solution was opaque, but there was no evidence of phase separation. The reaction was heated to ~90° C. and 83.04 g deionized water was added to further dilute the polymer solution. The polymer solution did not become clear. The yield of product measured in the flask was 245.64 g. An additional 4.26 g of deionized water was added to the reaction vessel. Adjusted yield: 249.9 g.

Theoretical solids of the polymer solution (based on the amount of maltodextrin and N-vinyl pyrrolidone added divided by the total yield of polymer solution): 20.0%. The experimental solids (gravimetric at 130° C. for 1.5 h, duplicate runs) was 20.4%. This corresponds to a monomer conversion of essentially 100%.

A small portion of the product was diluted to 10% solids. This did not clarify the solution.

Product was preserved by the addition of 0.75 wt. % Glydant Plus.

On standing for several days massive phase separation was noted.

Preparation of Gel Fixative Formulations

Hair fixative gels were prepared using the following general procedure.

Part A—58.4 grams of distilled water was added to a 250 ml beaker and mixed with a vortex extending to the bottom of the beaker. A total of 0.5 g of Carbopol 940 (Lubrizol Advance Material Inc, Cleveland, Ohio) was sifted onto the surface of the mixing water over 5 minutes and was mixed for 20 minutes until uniform. Then 2-Amino-2-Methyl-1 Propanol (Angus Chemical, Buffalo Grove, Ill.) was added to obtain a pH of 6.5+/−0.5 as needed (approximately 0.5 g). 0.5 grams (DMDM Hydantoin and Iodopropynyl Butylcarbamate) 1,3-Dihydroxylmethyl-5,5-Dimethylhydantoin and 3-Iodo-2-Propynyl Butyl Carbamate (LONZA Corporation, Allendale, N.J.) was added to the solution and mixed for approximately 10 minutes until clear and uniform.

Part B—37.5 grams of water was added to a 150 ml beaker and mixed with good vortexing. This was followed by adding a total of 3.0 grams (dry basis) of a comparative fixative polymer or a comparative combination of polymers, or an inventive fixative hybrid copolymer into the vortex and mixing for approximately 20 minutes until clear and uniform. In the case where the inventive polymer was in the form of an aqueous solution, the amount of water added to the 150 mL was reduced to allow for the amount of water that would be added to Part B with the inventive polymer.

Then Part B was slowly added to the main beaker (Part A). The completed gel was slowly mixed (overhead mixer at approximately 50 rpm) for an additional 10 minutes until uniform.

Preparation of Mousse Formulations

Mousse formulations were prepared using the following general procedure

To a 250 ml beaker was added 91 grams of water and mixed with a vortex extending to the bottom of the beaker. A total of 2.0 grams (dry basis) of comparative polymer or combination of polymers, or an inventive hybrid copolymer was sifted on to the surface of the mixing water over 2 minutes and was mixed for 20 minutes until uniform then 0.5 grams of Laureth-4 (Uniqema, New Castle, Del.) was added. Note that in the case where the inventive polymer was in the form of an aqueous solution, the amount of water added to the 250 mL was reduced to allow for the amount of water that would be added with the inventive polymer. Then 0.6 grams of Propylene Glycol (and) Diazolidinyl Urea (and) Methylparaben (and) Propylparben (International Specialty Products, Wayne, N.J.) was added. Then 2-Amino-2-Methyl-1 Propanol (Angus Chemical, Buffalo Grove, Ill.) was added to obtain a pH of 5.5+/−0.5 as needed (approximately 0.2 g). The solution was mixed until uniform. Then this formulation was placed into a common aluminum mousse can and sealed with a common mousse valve assembly and then charged with 6% by volume Isobutane (and) Propane (Dupont, Wilmington, Del.). The pressurizing process completed the formulation of a common mousse product.

Evaluation of Fixative Gels

1. Clarity and Viscosity Measurements of Gel Formulations (Gel Fixatives Only)

The clarity was measured on a Hach model 2100N turbidity meter in NTU. A lower NTU value reflects a clearer product. The viscosity was measured in centipoises using a Brookfield Viscometer with spindle TC/10 RPM/1 minute with samples at 25° C.

2. Subjective Evaluations of Styling Formulations on Hair

Evaluation is performed on 10" long, 2-gram swatches of European virgin brown hair by four trained panelists. Each panelist evaluated two pairs of treated hair swatches; one control and one test product in each pair. The swatches were numbered so that the panelist performing the test did not know the identity of the products under test. In each performance area, the panelist was required to select one swatch better than the other. Equal ratings were not permitted. These tests demonstrated how the products compared in performance. Differences in performance between the two samples were regarded as being statistically significant at the 95% confidence level, only if the sample displayed differences in at least seven of the eight comparisons. The samples were rated as "same as control" (=) if displaying a positive recommendation of less than 7 out of 8 but better that a negative comparison of 7 out of 8. They were rated as "better than control" (+) if displaying superiority in seven out of eight comparisons. They were rated as a "worse than control" (−) if they display a deficiency in seven out of eight comparisons.

Wet Combability: (8 Replicate Swatches/Sample)

1. Wet 10" long, clean European virgin brown hair swatch and comb through to remove tangles. Squeeze-out excess water. Record tag identification number.
2. Apply 0.5 grams of sample to swatch and "work" into hair.
3. Arrange in pairs consisting of one "test" swatch and one "control" swatch. Each panelist receives 2 sets to be evaluated.
4. Instruct panelist to comb each swatch gently several times and evaluate ease of combing.

Choose the one that combs more easily.

Place evaluated Wet Comb ability hair swatches back on tray and place in 120° F. oven to dry.

Instruct panelists to evaluate the pairs of dried hair swatches in each of the following areas in this order:

GLOSS: Gently handle the swatches so as not to break the film or stiffness. Visually inspect the swatches to determine which has more shine/gloss.

STIFFNESS: Gently handle the swatches and "feel" for differences in Stiffness. Using two fingers hold the middle of the swatch in a horizontal position—does one bend more than the other? Choose the one that is more rigid.

DRY COMBING: Comb each swatch gently five (5) times and evaluate ease of combing. Choose the one that combs more easily.

FLAKE: Visually inspect both the swatches after combing. Check the teeth of the comb for flake accumulation. Holding the swatch at the bound end, run your fingernail down the length of the tress, then inspect. Choose the one with more flakes.

ANTI-STATIC: Holding the swatch by the bound end, comb through vigorously 10 times and evaluate for extent of "flyaways" generated. Choose the swatch with more "flyaways".

FEEL: Handle the swatches and determine which one feels more silky/softer.

3. High Humidity Curl Retention (HHCR)

High humidity curl retention test were carried out. These evaluations used hair swatches with a fixed amount of hair gel applied on clean, wet 10" long, 2-gram swatches of European virgin brown hair. The hair tress is then rolled into a curl with the use of a plastic mandrel. The mandrel is carefully removed and the curl is secured with two common hair clips. The curl is then allowed to dry in a 120° F. oven over night. The curls are removed from the oven and placed on Plexiglas boards with a fixed measuring scale. The curls are gently unwound with a glass rod. Initial curl height readings are taken and the boards are placed into a controlled humidity cabinet set at 70° F./90% relative humidity. The curl lengths are measured at 15 minutes, 30 minutes, 60 minutes, 90, minutes, 2 hours, 3 hours, 4 hours, 5 hours and 24 hours time intervals. The measured curl heights at each interval are used to calculate the % curl retention values at that interval.

Gel Fixative Formulation Examples 1-9

Nine gel fixative formulations were prepared with the exemplary inventive polymer according to the general procedure for preparing gel fixative formulations given above. The clarity and viscosity of each gel was measured. The gel compositions are summarized in Table 2 below.

TABLE 2

Exemplary Gel Fixative Formulations.

| Gel Fixative Example | Fixative Polymer | Polymer solids (dry basis) in formulation |
|---|---|---|
| 1 | Synthesis Example 1 | 3.0 wt. % |
| 2 | Synthesis Example 2 | 3.0 wt. % |
| 3 | Synthesis Example 3 | 3.0 wt. % |
| 4 | Synthesis Example 4 | 3.0 wt. % |
| 5 | Synthesis Example 5 | 3.0 wt. % |
| 6 | Synthesis Example 6 | 3.0 wt. % |
| 7 | Synthesis Example 7 | 3.0 wt. % |
| 8 | Synthesis Example 8 | 3.0 wt. % |
| 9 | Synthesis Example 9 | 3.0 wt. % |

Comparative Gel Fixative Formulations 1-6

Six comparative gel fixative formulations were prepared with a commercial grade of poly(N-vinyl pyrrolidone) that is used in gel fixative products (PVP K-30; available from International Specialty Products, Wayne, N.J.), Maltrin M100, or combinations of these two materials as the fixative polymers. The comparative gel compositions are summarized in Table 3 below.

TABLE 3

Comparative Gel Fixative Formulations.

| Comparative Gel Fixative | Fixative Polymer | Polymer solids (dry basis) in formulation | |
|---|---|---|---|
| | | PVP K-30 | Maltrin M100 |
| 1 | PVP K-30 | 3.0 wt. % | 0.0 wt. % |
| 2 | Maltrin M100 | 0.0 wt. % | 3.0 wt. % |
| 3 | PVP K-30 and Maltrin M100 | 1.5 wt. % | 1.5 wt. % |
| 4 | PVP K-30 | 1.5 wt. % | 0.0 wt. % |
| 5 | PVP K-30 and Maltrin M100 | 1.95 wt. % | 1.06 wt. % |
| 6 | PVP K-30 and Maltrin M100 | 1.05 wt. % | 1.95 wt. % |

Clarity and Viscosity Measurements on Exemplary and Comparative Gel Fixative Formulations The clarity and viscosity of the exemplary and comparative gel fixative formulations were measured according to the procedure described above. The results are summarized in Table 4 below.

TABLE 4

Summary of clarity and viscosity measurements.

| Gel Fixative | Clarity (NTU) | Viscosity (cP) |
| --- | --- | --- |
| Inventive Gel Fixative Example 1 | 8.47 | 54,100 |
| Inventive Gel Fixative Example 2 | 9.77 | 55,200 |
| Inventive Gel Fixative Example 3 | 7.99 | 46,000 |
| Inventive Gel Fixative Example 4 | 6.2 | 42,000 |
| Inventive Gel Fixative Example 5 | 5.74 | 43,400 |
| Inventive Gel Fixative Example 6 | 12.8 | 49,400 |
| Inventive Gel Fixative Example 7 | 4.76 | 35,260 |
| Inventive Gel Fixative Example 8 | 32.3 | 45,390 |
| Inventive Gel Fixative Example 9 | 15.4 | 49,200 |
| Comparative Gel Fixative 1 | 5.89 | 48,300 |
| Comparative Gel Fixative 2 | 5.41 | 45,500 |
| Comparative Gel Fixative 3 | 4.60 | 46,300 |
| Comparative Gel Fixative 4 | 4.87 | 41,500 |
| Comparative Gel Fixative 5 | 6.27 | 42,500 |
| Comparative Gel Fixative 6 | 4.53 | 40,200 |

As can be seen, the clarity and viscosity of the exemplary gel fixatives are very similar to those of the Comparative Gel Fixative 1, which is a suitable commercial gel fixative formulation. Note that a clarity of less than 40 NTU is acceptable while a clarity of less than 20 NTU is preferred, and a clarity of less than 10 NTU is most preferred.

Subjective Evaluations of Exemplary and Comparative Gel Fixative Formulations A Series of subject evaluations were done in which the performance of Exemplary Gel Fixative Formulations were compared to Comparative Gel Fixative Formulations according to the test methods described above. The results are summarized in Tables 5-8.

TABLE 5

Subjective properties of Exemplary Gel Fixative Formulations (EGF) and Comparative Gel Fixative Formulations (CGF) vs. Comparative Gel Fixative Formulation 1.

|  | CGF 1 | CGF 2 | CGF 3 | CGF 4 | EGF 1 | EGF 2 | EGF 3 | EGF 4 |
| --- | --- | --- | --- | --- | --- | --- | --- | --- |
| Wet Comb | n/a | = | = | = | = | − | | |
| Gloss | n/a | = | = | = | = | = | = | = |
| Stiffness | n/a | − | = | − | = | = | − | = |
| Dry Comb | n/a | + | + | = | + | = | = | + |
| Flake | n/a | = | = | − | = | − | − | = |
| Anti Static | n/a | = | = | = | = | = | − | = |
| Dry feel | n/a | + | = | + | = | = | = | = |

The exemplary gel fixative formulations made with the exemplary hybrid copolymer perform comparably to the Comparative Gel Fixative 1, which is a suitable commercial gel fixative formulation. Exemplary Gel Fixative formulations 1, 2, and 4 are equivalent to Comparative Gel Fixative 1 in stiffness, which demonstrates that a hybrid copolymer composition derived from up to 65 wt. % maltodextrin can perform equally on a weight basis to a fully synthetic polymer composition in a gel fixative formulation in this important property. Several of the exemplary gel fixative formulations outperform Comparative Gel Fixative 1 in Dry Comb and Flake properties.

TABLE 6

Subjective properties of Exemplary Gel Fixative Formulations (EGF) vs. Comparative Gel Fixative Formulation 3 (CGF 3).

|  | CGF 3 | EGG 1 | EGF 2 | EGF 3 | EGF 4 |
| --- | --- | --- | --- | --- | --- |
| Wet Comb | n/a | = | = | | |
| Gloss | n/a | = | = | + | = |
| Stiffness | n/a | = | + | + | = |
| Dry Comb | n/a | = | = | = | = |
| Flake | n/a | = | = | = | = |
| Anti Static | n/a | = | = | = | = |
| Dry feel | n/a | = | = | = | = |

The stiffness of EGF 2 and EGF 3 are superior to CGF 3, which is a formulation made with a simple blend of PVP K-30 and Maltrin M100. This demonstrates that the hybrid copolymer compositions are superior in performance to simple blends when used at similar levels in a gel fixative formulation.

TABLE 7

Subjective properties of Exemplary Gel Fixative Formulations 3 (EGF 3) vs. Comparative Gel Fixative Formulation 5 (CGF 5).

|  | CGF 5 | EGF 3 |
| --- | --- | --- |
| Wet Comb | n/a | |
| Gloss | n/a | = |
| Stiffness | n/a | = |
| Dry Comb | n/a | = |
| Flake | n/a | = |
| Anti Static | n/a | = |
| Dry feel | n/a | = |

TABLE 8

Subjective properties of Exemplary Gel Fixative Formulations 4 (EGF 4) vs. Comparative Gel Fixative Formulation 6 (CGF6).

|  | CGF 6 | EGF 4 |
| --- | --- | --- |
| Wet Comb | n/a | |
| Gloss | n/a | = |
| Stiffness | n/a | = |

TABLE 8-continued

Subjective properties of Exemplary Gel Fixative Formulations 4 (EGF 4) vs. Comparative Gel Fixative Formulation 6 (CGF6).

|  | CGF 6 | EGF 4 |
|---|---|---|
| Dry Comb | n/a | + |
| Flake | n/a | = |
| Anti Static | n/a | = |
| Dry feel | n/a | = |

High Humidity Curl Retention (HHCR) of Exemplary and Comparative Gel Fixative Formulations The High Humidity Curl Retention of EGFs 1, 2, 3, 4 and CGFs 1 and 3 were measured according to the test method described above. The results are summarized in Table 9 below and shown graphically in FIG. 1.

TABLE 9

Humidity Curl Retention of EGFs 1, 2, 3, 4 and CGFs 1 and 3

| Sample | 1 Hr | 5 Hr | 24 Hr |
|---|---|---|---|
| CGF | 31.92 | 18.50 | 16.91 |
| CGF 3 | 40.30 | 23.45 | 20.81 |
| EGF 1 | 56.37 | 30.40 | 26.19 |
| EGF | 62.75 | 27.47 | 23.60 |
| EGF 3 | 35.32 | 16.52 | 15.17 |
| EGF 4 | 36.48 | 19.49 | 17.58 |

As can be seen in FIG. 1, EGF 1 and 2 have better high humidity curl retention than both CGF 1 and 3. This demonstrates that a hybrid copolymer composition derived from up to 50 wt. % maltodextrin can outperform on an equal weight basis a fully synthetic polymer composition in a gel fixative formulation in this important property. It also demonstrates that the hybrid copolymer compositions are superior in performance to simple blends when used at similar levels in a gel fixative formulation.

Mousse Formulation Example 1

An exemplary mousse formulation was prepared using Synthesis Example PC1 according to the general procedure for preparing mousse formulations given above.

Mousse Formulation Example 2

6% VOC Root Lifting Aerosol Mousse Formula

An exemplary 6% VOC Root lifting aerosol mousse formula was prepared using the following ingredients:

| Ingredient | INCI Designation | % W/W | Supplier |
|---|---|---|---|
| Part A | | | |
| AMAZE | Corn Starch Modified | 2.20 | National Starch |
| Plymr of Syn Ex 11 | Not applicable | 0.6 | |
| Carbopol Ultrez 10 | Acrylates/C10-30 Alkyl Acrylate Crosspolymer (copolymer) | 0.05 | Noveon |
| Natrosol HHR | Hydroxyethylcellulose | 0.15 | Aqualon |
| Deionized Water | Water (Aqua) | 70.32 | |
| TEA | Triethanolamine 99% | 0.05 | |

-continued

| Ingredient | INCI Designation | % W/W | Supplier |
|---|---|---|---|
| Part B | | | |
| DC-193 | PEG-12 Dimethicone | 0.07 | Dow Corning |
| Versene 100 | Tetrasodium EDTA | 0.10 | Dow Chemical |
| Crovol Pk-70 | PEG-45 Palm Kernal Glycerides | 0.10 | Croda, Inc |
| Cropetide W | Hydrolyzed Wheat Protein (and) Hydrolyzed Wheat Starch | 0.20 | Croda. Inc. |
| Procetyl AWS | PPG-5 Ceteth-20 | 0.10 | Croda, Inc |
| dl-Panthenol | Panthenol | 0.10 | Ritapan |
| Rewoteric AM B-14 | Cocomidapropyl Betaine | 0.05 | Goldschmidt |
| Tween 20 | Polysorbate 20 | 0.20 | Uniqema |
| Uvinul MS-40 | Benzephenone - 4 | 0.001 | BASF |
| Hydroxy-ethylurea | Hydroxyethyl Urea | 3.00 | National Starch |
| Ammonium Lactate | Ammonium Lactate | 0.06 | National Starch |
| Germaben II | Propylene Glycol (and) Diazolidinyl Urea (and) Methylparaben (and) Propylparaben | 1.00 | Sutton Labs |
| Part C | | | |
| DME | Dimethyl Ether | 6.00 | |
| Dymel 152A | Hydrofluorocarbon 152A | 16.00 | Dupont |
| | | 100.00 | |

Procedure

The Carbopol is slowly sifted into the mixing vortex until completely dispersed. While maintaining good agitation, the NATROSOL® HHR is then slowly sifted in. Once dispersed, both the AMAZE™ and the Polymer of Synthesis Example 11 is sifted in. When the solution is complete, the TEA is added. The ingredients in Part B are then added and mixed until homogeneous. Filter and fill aerosol containers. For Part C, charge with propellant.

Comparative Mousse Formulation 1

A comparative mousse formulation was prepared using PVP/VA S-630 (N-vinyl pyrrolidone/vinyl acetate copolymer available from International Specialty Products, Wayne, N.J.) according to the general procedure for preparing mousse formulations given above.

Evaluation of Subjective Properties of Exemplary Mousse Formulation 1 and Comparative Mousse Formulation 1

An evaluation of the subjective properties of Exemplary Mousse Formulation 1 and Comparative Mousse Formulation 1 was done according to the test methods described above. The results are summarized in Table 10 below.

TABLE 10

Subjective properties of Exemplary Mousse Formulation 1 vs. Comparative Mousse Formulation 1.

|  | Comparative Mousse Formulation 1 | Exemplary Mousse Formulation 1 |
|---|---|---|
| Wet Comb | n/a | = |
| Gloss | n/a | = |
| Stiffness | n/a | = |
| Dry Comb | n/a | = |
| Flake | n/a | = |

TABLE 10-continued

Subjective properties of Exemplary Mousse Formulation 1 vs. Comparative Mousse Formulation 1.

|  | Comparative Mousse Formulation 1 | Exemplary Mousse Formulation 1 |
| --- | --- | --- |
| Anti Static | n/a | – |
| Dry feel | n/a | = |
| Foam density | 0.0596 | 0.0616 |

As can be seen from the data, the exemplary mousse formulation is essentially equivalent to the comparative mousse formulation, which is which is a suitable commercial mousse formulation. This demonstrates that a hybrid copolymer composition derived from 50 wt. % maltodextrin can perform equally on a weight basis to a fully synthetic polymer composition in a mousse formulation.

Shampoo Example 1

Clear Conditioning Shampoo Formula

A clear conditioning shampoo formula was prepared using the following ingredients:

| Ingredients | INCI Designation | % W/W | Supplier |
| --- | --- | --- | --- |
| Plymr of Syn Ex 12 | Not applicable | 0.6 | |
| Hydroxyethylurea | Not applicable | 3.00 | National Starch |
| Ammonium Lactate | Ammonium Lactate | 0.06 | |
| DeIonized Water | Water (Aqua) | 18.18 | |
| Standapol ES-2 | Sodium Lauryl Sulfate | 33.33 | Cognis Corp. |
| Standapol ES-3 | Sodium Laureth Sulfate | 30.00 | Cognis Corp. |
| Dehyton K | Cocamidopropyl Betaine | 10.00 | Cognis Corp. |
| Promodium CO | Polypropoxyethoxycocamide | 3.18 | Uniqema |
| Germaben II | Diazolidinyl Urea, Propylene Glycol, Methylparaben, Propylparaben | 1.00 | Sutton Laboratories |
| Sodium Chloride | Sodium Chloride | 1.00 | J. T. Baker |
| Citric Acid | Citric Acid | q.s. | |
| | | 100.00 | |

Procedure

The ingredients are combined in the order listed above. The formulation is mixed until homogeneous after each addition.

Combing Cream Formulation Example 1

Combing Cream for Dry/Damaged Hair Formula

| Ingredient | INCI Designation | % W/W | Supplier |
| --- | --- | --- | --- |
| Phase A | | | |
| Cetearyl Alcohol | 30/70 Cetearyl Alcohol | 1.80 | |
| Hostacerin CS200 | Ceteareth-20 | 0.20 | Clariant |
| Genamin KDMP | Behentrimonium Chloride | 0.44 | Clariant |
| DC 949 | Amodimethicone (and) Trideceth-12(and) Cetrimonium Chloride | 0.50 | Dow Corning |
| Phase B | | | |
| DI Water | Water (Aqua) | 88.94 | |
| STRUCTURE ZEA | Hydroxypropyl Starch Phosphate | 4.00 | National Starch |
| Plymr of Syn Ex 13 | Not applicable | 1.0 | |
| Phase C | | | |
| Genamin CTAC 50 | Cetrimonium Chloride | 0.30 | Clariant |
| Phase D | | | |
| Glydant | DMDM Hydantoin | 0.20 | Lonza |
| Phenonip | Phenoxyethanol (and) Methylparaben (and) Ethylparaben (and) Butylparaben (and) Propylparaben (and) Isobutylparaben | 0.15 | Nipa/Clariant |
| Hydroxyethylurea | Hydroxyethylurea | 3.00 | National Starch |
| Ammonium Lactate | Ammonium Lactate | 0.06 | |
| Phase E | | | |
| Citric acid (10%) | Citric Acid | q.s. | pH 4.0-5.0 |
| | | 100.00 | |

Procedure

Dissolve STRUCTURE ZEA into the water at room temperature. Add the Polymer of Synthesis Example 13 and heat to 80° C. while mixing (Phase B). In a separate vessel, combine Phase A and heat to 80° C. Add Phase B to Phase A with agitation. Add Phase C while maintaining temperature (80° C.). Continue mixing and cool to 45° C. Add Phase D and adjust pH, if necessary.

Conditioning Formulation Example 1

Conditioning Styling Gel Formula

An exemplary conditioning styling gel formula was prepared using the following ingredients:

| Ingredient | INCI Designation | % W/W | Supplier |
| --- | --- | --- | --- |
| Part A | | | |
| Deionized Water | Water (Aqua) | 50.00 | |
| AMAZE XT | Dehydroxanthan Gum | 1.00 | National Starch |
| Part B | | | |
| Deionized Water | Water (Aqua) | 41.74 | |
| Plymr of Syn Ex 16 | Not applicable | 0.3 | |
| Part C | | | |
| Propylene Glycol | Propylene Glycol | 2.00 | |
| DL-Panthenol | Panthenol | 0.50 | Roche |
| Na2EDTA | Disodium EDTA | 0.05 | |
| Hydroxyethylurea | Hydroxyethylurea | 3.00 | |
| Ammonium Lactate | Ammonium Lactate | 0.06 | |
| Cropeptide W | Hydrolyzed Wheat Protein and Hydrolyzed Wheat Starch | 1.00 | Croda |
| DC 193 | PEG-12 Dimethicone | 0.20 | Dow Corning |
| Glydant Plus Granular | DMDM Hydantoin and Iodopropynyl Butylcarbamate | 0.30 | |
| | | 100.00 | Lonza |

Procedure

Dust AMAZE XT into the water in Part A and mix until completely hydrated. Separately, combine the ingredients of Part B and mix until dissolved. Add Part B to Part A with agitation. Add remaining ingredients and mix until uniform.

Conditioning Formulation Example 2

Leave-in Conditioner Formula

An exemplary leave-in conditioner formula was prepared using the following ingredients:

| Ingredients | INCI Designation | % W/W | Supplier |
|---|---|---|---|
| Phase A | | | |
| Plymr of Syn Ex 17 | Not applicable | 1.2 | |
| Deionized Water | Water (Aqua) | 48.00 | |
| dl-Panthenol | Panthenol | 0.50 | Tri-K Industries |
| Phase B | | | |
| Deionized Water | Water (Aqua) | 44.79 | |
| TEA | Triethanolamine | 0.20 | |
| Neo Heliopan, Phenyl Type Hydro | Benzimidazole Sulfonic Acid | 0.20 | Haarmann & Reimer |
| DC 929 Cationic Emulsion | Amodimethicone (and) Tallowtrimonium Chloride (and) Nonoxynol-10 | 0.75 | Dow Corning |
| Phase C | | | |
| Solu-Silk Protein | Hydrolyzed Silk | 1.00 | Brooks Industries |
| Versene 100 | Tetra Sodium EDTA | 0.20 | Dow Chemical |
| Glydant | DMDM Hydantoin | 1.00 | Lonza |
| Hydroxyethylurea | Hydroxyethylurea | 3.00 | |
| Ammonium Lactate | Ammonium Lactate | 0.06 | |
| Fragrance | Fragrance (Perfume) | q.s. | |
| | | 100.00 | |

Preparation

Prepare Phase A by dissolving the Polymer of Synthesis Example 17 in water using good agitation. Mix until solution is clear and homogenous. Add dl-Panthenol and allow to completely dissolve. Prepare Phase B by adding TEA to water and mix well. Add Neo Heliopan and mix until clear. Follow with DC 929 cationic emulsion. Combine parts by adding Phase B to Phase A. Mix well and continue to mix for approximately 15 minutes. Add Solu-silk and mix well. Add Versene 100, Glydant, hydroxyethylurea, ammonium lactate, and fragrance, mixing well after each addition.

Conditioning Formulation Example 3

Clear Conditioner with Suspended Beads

An exemplary clear conditioner with suspended beads was prepared using the following ingredients:

| Ingredients | INCI Designation | % W/W | Supplier |
|---|---|---|---|
| Phase A | | | |
| Deionized Water | Water (Aqua) | 78.74 | |
| Plymr of Syn Ex 18 | Not applicable | 1.0 | |
| Glydant | DMDM Hydantoin | 0.50 | Lonza |
| Propylene Glycol | Propylene Glycol | 2.0 | |
| Arquad 16-25W | Cetrimonium Chloride | 2.00 | Akzo-Nobel |
| STRUCTURE PLUS | Acrylates/Aminoacrylates/ C10-30 Alkyl PEG-20 Itaconate Copolymer | 10.00 | National Starch |
| Hydroxyethylurea | Hydroxyethylurea | 3.00 | |
| Ammonium Lactate | Ammonium Lactate | 0.06 | |
| Versene 100 | Tetrasodium EDTA | 0.05 | Dow Chemical |
| Phase B | | | |
| Silsoft A-858 | Dimethicone Copolyol Bishydroxyethylamine | 2.00 | CK Witco OSI |
| Neo Heliopan AV | Ethylhexyl Methoxycinnamate | 0.05 | Haarman & Reimer |
| Phase C | | | |
| Glycolic Acid (70%) | Glycolic Acid | 0.45 | |
| Phase D | | | |
| Florabeads | Jojoba Esters | 0.80 | Floratech |
| | | 100.00 | |

Procedure

Polyquaternium-4 is dissolved in water with mixing. The remaining ingredients of Phase A are sequentially added with continued mixing. Phase B is combined and then added to Phase A. Continue to mix while slowly adding glycolic acid to Phase AB, taking care to avoid entrapped air. Finally, add beads slowly while mixing.

Pump Hairspray Example 1

55% VOC Firm Hold, Crystal Clear Pump Hairspray Formula

An exemplary 55% VOC firm hold, crystal clear pump hairspray formula was prepared using the following ingredients:

| Ingredients | INCI Designation | % W/W | Supplier |
|---|---|---|---|
| Plymr of Syn Ex 21 | Not applicable | 12.00 | |
| AMP (reg) | Aminomethyl Propanol | 0.85 | Dow Chemical |
| Deionized Water | Water (Aqua) | 29.09 | |
| Hydroxyethylurea | Hydroxyethylurea | 3.00 | |
| Ammonium Lactate | Ammonium Lactate | 0.06 | |
| *SD Alcohol 40 | SD Alcohol 40 | 55.00 | |
| | | 100.00 | |

Preparation

Dissolve AMP in SD Alcohol 40 and water. While maintaining proper agitation, slowly pour in BALANCE 0/55. Add remaining ingredients and mix until homogenous.

Sunscreen Example 1

Sunscreen Formulas

Exemplary sunscreen formulas were prepared using the following ingredients:

| Ingredient | Function | Formula A | Formula B | Formula C |
|---|---|---|---|---|
| PHASE A | | | | |
| Isohexadecane | Emollient | 1.5 | 1.5 | 1.5 |
| C12-C15 alkyl benzoate | Emollient | 3.0 | 3.0 | 3.0 |
| Cyclopentasiloxane | Emollient | 2.25 | 2.25 | 2.25 |
| Sorbitan Stearate | Emulsifier | 1.0 | 1.0 | 1.0 |
| Glyceryl Stearate (and) PEG-100 Stearate | Emulsifier | 2.0 | 2.0 | 2.0 |
| Caprylic/Capric Triglyceride | Solubilizer | 0.0 | 6.25 | 6.25 |
| Isopropyl Myristate | Solubilizer | 0.0 | 6.25 | 6.25 |
| Octocrylene | UVB filter (org) | 2.0 | 0.0 | 0.0 |
| Ethylhexyl Methoxycinnamate | UVB filter (org) | 7.5 | 0.0 | 0.0 |
| Benzophenone-3 | UVB filter (org) | 3.0 | 0.0 | 0.0 |
| ZnO (and) C12-C15 Alkyl Benzoate (and) Polyhydroxystearic Acid | UVA/B filter (inorg) | 0.0 | 6.0 | 6.0 |
| PHASE B | | | | |
| Water | | 67.25 | 54.25 | 58.65 |
| Dehydroxanthan Gum | Suspension agent, Rheology modifier | 0.5 | 0.5 | 0.0 |
| Xanthan Gum | Rheology modifier | 0.0 | 0.0 | 0.5 |
| Plymr of Syn Ex 21 | Film former | 4.4 | 4.4 | 4.4 |
| Glycerin | Humectant | 3.0 | 3.0 | 3.0 |
| $TiO_2$ and Alumina and Silica and Sodium Polyacrylate | UVB filter (inorg) | 0.0 | 7.0 | 7.0 |
| PHASE C | | | | |
| Corn Starch Modified | Aesthetic enhancer | 2.0 | 2.0 | 2.0 |
| DMDM Hydantoin and Iodopropynyl Butylcarbamate | Preservative | 0.6 | 0.6 | 0.6 |
| Citric Acid (50%) | Neutralizer | qs to pH 7 | qs to pH 7 | qs to pH 7 |
| TOTAL | | 100 | 100 | 100 |

All documents cited in the Detailed Description of the Invention are, in relevant part, incorporated herein by reference; the citation of any document is not to be construed as an admission that it is prior art with respect to the present invention.

While particular embodiments of the present invention have been illustrated and described herein, the invention is not intended to be limited to the details shown. Rather, various modifications may be made in the details within the range and scope of equivalents of the claims and without departing from the spirit and scope of the invention.

What is claimed is:

1. A personal care composition comprising:
   a hybrid copolymer comprising at least one ethylenically unsaturated monomer and a naturally derived hydroxyl containing chain transfer agent as an end group, wherein the naturally derived hydroxyl containing chain transfer agent is a hydroxyl containing moiety obtained from plant sources directly or by enzymatic or fermentation processes, and wherein the naturally derived hydroxyl containing chain transfer agent is present in an amount of about 35% to about 90% by weight of the hybrid copolymer;
   a hybrid synthetic copolymer comprising one or more synthetic polymers derived from the at least one ethylenically unsaturated monomer with at least one initiator fragment as an end group;
   an effective amount of a cosmetic or personal care additive; and wherein the personal care composition is selected from the group consisting of a skin lotion, a skin cream, a skin gels, a facial cleansing product, a body cleansing product, a shaving preparation, a wipe, a liquid soap, a bar soap, a color cosmetic formulation, a make-up formulation, a foundation, a sun care product, a sunscreen, a sunless tanning formulation, a shampoo, a conditioner, a hair color formulation, a hair relaxer, a product containing AHA or BHA, and a hair fixative.

2. The personal care composition of claim 1 wherein the at least one ethylenically unsaturated monomer is non-anionic.

3. The personal care composition of claim 1 wherein the at least one ehtylenically unsaturated monomer is anionic.

4. The personal care composition of claim 2 wherein the at least one ethylenically unsaturated monomer is nonionic or cationic.

5. The personal care composition of claim 1 wherein the hybrid copolymer has an average molecular weight of about 100,000 or less.

6. The personal care composition of claim 1 wherein the chain transfer agent has a molecular weight of about 100,000 or less.

7. The personal care composition of claim 1 wherein the naturally derived hydroxyl containing chain transfer agent is a polysaccharide.

8. The personal care composition of claim 7 wherein the polysaccharide is chosen from a hydrolyzed starch having a dextrose equivalent of greater than 5 or a maltodextrin having a dextrose equivalent of greater than 5.

9. The personal care composition of claim 8 wherein the maltodextrin has a dextrose equivalent of 10 or greater.

10. The personal care composition of claim 1 wherein the personal care or cosmetic additive is an aesthetic enhancer, a conditioning agent, an adjuvant, a preservative, a thickener, a gelling agent or a fixative.

11. The personal care composition of claim 1 wherein the naturally derived hydroxyl containing chain transfer agent and the ethylenically unsaturated monomer are present in the personal care composition in a 50/50 ratio.

12. The personal care composition of claim 1 wherein the initiator fragment is derived from an azo initiator, a tert-butyl hydroperoxide and erythorbic acid redox system, peroxide or an amine.

13. The personal care composition of claim 12 wherein the azo initiator is 2,2'-Azobis[2-methyl-N-(2-hydroxyethyl) propionamide].

14. The personal care composition of claim 8 wherein the composition is a hair cosmetic composition and further comprises 0.01 to 20% by weight, based on the weight of the composition, of a hair cosmetic additive.

15. The personal care composition of claim 14 wherein the hair cosmetic additive is an acrylic-based carbomer.

16. The personal care composition of claim 4 wherein the nonionic ethylenically unsaturated monomer is a vinyl lactam or a vinyl lactam with a co-monomer.

17. The personal care composition of claim 4 wherein the nonionic ethylenically unsaturated monomer is N-vinyl pyrrolidone or N-vinyl formamide.

18. The personal care composition of claim 14 wherein the hair cosmetic composition is a gel or a mousse.

19. The personal care composition of claim 1 wherein the cosmetic or personal care additive is present from about 0.01 up to about 20% by weight, based on the weight of the composition.

20. A personal care composition comprising:
   a hybrid copolymer consisting essentially of at least one cationic ethylenically unsaturated monomer or at least one nonionic ethylenically unsaturated monomer or combinations thereof and a naturally derived hydroxyl containing chain transfer agent as an end group, wherein the naturally derived hydroxyl containing chain transfer agent is a hydroxyl containing moiety obtained from plant sources directly or by enzymatic or fermentation processes;
   a hybrid synthetic copolymer consisting essentially of one or more synthetic polymers derived from the at least one cationic ethylenically unsaturated monomer or the at least one nonionic ethylenically unsaturated monomer or combinations thereof with at least one initiator fragment as an end group;
   an effective amount of a cosmetic or personal care additive;
   wherein the at least one nonionic ethylenically unsaturated monomer is chosen from hydroxyalkyl(meth)acrylates, alkyl(meth)acrylates, vinyl acetate, vinyl morpholine, vinyl pyrrolidone, vinyl caprolactam, vinyl formamide, vinyl acetamide, ethoxylated alkyl, alkaryl or aryl monomers, allyl glycidyl ether, allyl alcohol, glycerol (meth)acrylate, or monomers containing silane, silanol and siloxane functionalities, vinyl lactam or a vinyl lactam with a co-monomer; and
   wherein the personal care composition is selected from the group consisting of a skin lotion, a skin cream, a skin gels, a facial cleansing product, a body cleansing product, a shaving preparation, a wipe, a liquid soap, a bar soap, a color cosmetic formulation, a make-up formulation, a foundation, a sun care product, a sunscreen, a sunless tanning formulation, a shampoo, a conditioner, a hair color formulation, a hair relaxer, a product containing AHA or BHA, and a hair fixative.

21. The personal care composition of claim 20 wherein the hybrid copolymer has an average molecular weight of about 100,000 or less.

22. The personal care composition of claim 20 wherein the chain transfer agent has a molecular weight of about 100,000 or less.

23. The personal care composition of claim 20 wherein the naturally derived hydroxyl containing chain transfer agent is a polysaccharide.

24. The personal care composition of claim 23 wherein the polysaccharide is chosen from a hydrolyzed starch having a dextrose equivalent of greater than 5 or a maltodextrin having a dextrose equivalent of greater than 5.

25. The personal care composition of claim 24 wherein the maltodextrin has a dextrose equivalent of 10 or greater.

26. The personal care composition of claim 20 wherein the personal care or cosmetic additive is an aesthetic enhancer, a conditioning agent, an adjuvant, a preservative, a thickener, a gelling agent or a fixative.

27. The personal care composition of claim 20 wherein the naturally derived hydroxyl containing chain transfer agent is present in an amount of about 35% to about 90% by weight of the hybrid copolymer.

28. The personal care composition of claim 20 wherein the naturally derived hydroxyl containing chain transfer agent and the non-anionic ethylenically unsaturated monomer are present in the personal care composition in a 50/50 ratio.

29. The personal care composition of claim 20 wherein the initiator fragment is derived from an azo initiator, a tert-butyl hydroperoxide and erythorbic acid redox system, peroxide or an amine.

30. The personal care composition of claim 29 wherein the azo initiator is 2,2'-Azobis[2-methyl-N-(2-hydroxyethyl) propionamide].

31. The personal care composition of claim 26 wherein the composition is a hair cosmetic composition and further comprises 0.01 to 20% by weight, based on the weight of the composition, of a hair cosmetic additive.

32. The personal care composition of claim 31 wherein the hair cosmetic additive is an acrylic-based carbomer.

33. The personal care composition of claim 20 wherein the nonionic ethylenically unsaturated monomer is a vinyl lactam or a vinyl lactam with a co-monomer.

34. The personal care composition of claim 20 wherein the nonionic ethylenically unsaturated monomer is N-vinyl pyrrolidone or N-vinyl formamide.

35. The personal care composition of claim 31 wherein the hair cosmetic composition is a gel or a mousse.

36. The personal care composition of claim 20 wherein the cosmetic or personal care additive is present from about 0.01 up to about 20% by weight, based on the weight of the composition.

* * * * *